United States Patent
Inoue et al.

(10) Patent No.: US 10,546,691 B2
(45) Date of Patent: Jan. 28, 2020

(54) CAPACITOR AND METHOD FOR MANUFACTURING THE SAME

(71) Applicant: Murata Manufacturing Co., Ltd., Nagaokakyo-shi, Kyoto-fu (JP)

(72) Inventors: Noriyuki Inoue, Nagaokakyo (JP); Takeo Arakawa, Nagaokakyo (JP); Kensuke Aoki, Nagaokakyo (JP); Hiromasa Saeki, Nagaokakyo (JP); Koichi Kanryo, Nagaokakyo (JP); Akihiro Tsuru, Nagaokakyo (JP); Haruhiko Mori, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/888,351

(22) Filed: Feb. 5, 2018

(65) Prior Publication Data
US 2018/0158610 A1 Jun. 7, 2018

Related U.S. Application Data

(63) Continuation of application No. PCT/JP2016/072518, filed on Aug. 1, 2016.

(30) Foreign Application Priority Data

Aug. 12, 2015 (JP) .................. 2015-159581

(51) Int. Cl.
*H01G 4/30* (2006.01)
*H01G 4/06* (2006.01)

(52) U.S. Cl.
CPC ................ *H01G 4/06* (2013.01); *H01G 4/30* (2013.01)

(58) Field of Classification Search
CPC .......... H01G 9/012; H01G 9/15; H01G 9/028; H01G 9/045; H01G 9/055; H01G 4/06; H01G 4/30; H01G 4/012; H01G 4/12
See application file for complete search history.

(56) References Cited

U.S. PATENT DOCUMENTS

| | | | | |
|---|---|---|---|---|
| 5,790,368 A | * | 8/1998 | Naito | ........................ H01G 9/15 361/523 |
| 6,775,127 B2 | | 8/2004 | Yoshida | |
| 8,865,351 B2 | * | 10/2014 | Mayes | .................... C01B 32/20 429/231.8 |

(Continued)

FOREIGN PATENT DOCUMENTS

| | | |
|---|---|---|
| JP | 2003-338433 A | 11/2003 |
| JP | 2009-81429 A | 4/2009 |

(Continued)

OTHER PUBLICATIONS

International Search Report issued in International Application No. PCT/JP2016/072518, dated Oct. 18, 2016.

(Continued)

*Primary Examiner* — Nguyen T Ha
(74) *Attorney, Agent, or Firm* — Arent Fox LLP

(57) ABSTRACT

A capacitor that includes a conductive base material with high specific surface area, a dielectric layer covering the conductive base material with high specific surface area, and an upper electrode covering the dielectric layer, in which the conductive base material with high specific surface area is formed of a metal sintered body as a whole.

18 Claims, 8 Drawing Sheets

(56) References Cited

U.S. PATENT DOCUMENTS

| | | | |
|---|---|---|---|
| 2003/0081374 A1* | 5/2003 | Takada | H01G 9/0036 |
| | | | 361/523 |
| 2003/0218859 A1 | 11/2003 | Yoshida | |
| 2004/0240154 A1 | 12/2004 | Yoshida | |
| 2008/0318378 A1* | 12/2008 | Wu | H01L 27/10852 |
| | | | 438/253 |
| 2012/0094016 A1* | 4/2012 | Taira | H01G 9/045 |
| | | | 427/80 |
| 2013/0286538 A1* | 10/2013 | Kim | H01G 4/30 |
| | | | 361/303 |
| 2015/0057144 A1* | 2/2015 | Erlebacher | C22C 32/0047 |
| | | | 501/96.1 |
| 2015/0270026 A1* | 9/2015 | Izumi | F01N 3/027 |
| | | | 428/116 |
| 2015/0332863 A1* | 11/2015 | Ahopelto | H01G 11/28 |
| | | | 257/532 |
| 2016/0093442 A1* | 3/2016 | Nagamoto | H01G 4/30 |
| | | | 361/301.4 |
| 2017/0216923 A1* | 8/2017 | Babenko | B01J 35/0006 |

FOREIGN PATENT DOCUMENTS

| | | |
|---|---|---|
| JP | 2009-270140 A | 11/2009 |
| JP | 2011-204728 A | 10/2011 |

OTHER PUBLICATIONS

Written Opinion of the International Searching Authority issued in International Application No. PCT/JP2016/072518, dated Oct. 18, 2016.

\* cited by examiner

CAPACITOR AND METHOD FOR MANUFACTURING THE SAME

CROSS REFERENCE TO RELATED APPLICATIONS

The present application is a continuation of International application No. PCT/JP2016/072518, filed Aug. 1, 2016, which claims priority to Japanese Patent Application No. 2015-159581, filed Aug. 12, 2015, the entire contents of each of which are incorporated herein by reference.

FIELD OF THE INVENTION

The present invention relates to a capacitor and a method for manufacturing the capacitor.

BACKGROUND OF THE INVENTION

In recent years, capacitors having higher electrostatic capacitance have been required as electronic devices are mounted with high density. As such a capacitor, Patent Document 1 discloses an electrolytic capacitor including a high specific surface area aluminum foil made porous by etching treatment, for example.

Patent Document 1: Japanese Unexamined Patent Application Publication No. 2009-270140

SUMMARY OF THE INVENTION

As described in Patent Document 1, a method for etching a metal foil is known as a method for obtaining a conductive base material with high specific surface area for a capacitor. Etching treatment is chemical treatment, and is performed by immersing a metal foil to be treated in an electrolytic solution while electric current is flown, for example. Accordingly, chemicals used in the chemical treatment, such as impurities derived from the electrolytic solution, may remain in pores of etching foil. Existence of such impurities in the pores may cause troubles, such as deterioration in withstand voltage of the capacitor, and the like.

The present inventors have studied to obtain a conductive base material with high specific surface area with a small amount of impurities in pores, and have conceived of using a metal sintered body as a conductive base material with high specific surface area for a capacitor. The present inventors have further proceeded with the study to find that simple sintering of metal powders causes the following problems to make a capacitor having excellent performance difficult to be provided.

(1) Simple sintering of metal powders cannot achieve both sufficient electrostatic capacitance and strength. The metal powders need to be treated at high temperature to further advance sintering in order to obtain a conductive base material with high specific surface area with sufficient strength, for example. However, as the sintering of the metal powders progresses, pores of a metal sintered body crush to make sufficient electrostatic capacitance difficult to be obtained. Meanwhile, in order to obtain a conductive base material with high specific surface area that provides a sufficient electrostatic capacitance, the metal powders need to be treated at low temperature so that sintering does not progress much to maintain pores of a metal sintered body. However, when the sintering is insufficient, sufficient strength cannot be secured.

(2) In addition, when a metal sintered body is formed on a metal support in order to secure its strength, the metal support may be warped due to shrinkage during sintering of metal powders.

(3) Further, when the metal support and the metal sintered body are fired, the sintered body is difficult to be bonded to the metal support. In order to sufficiently bond the metal support and the metal sintered body to each other, treatment at higher temperature is required. However, when firing is performed at high temperature, pores of the conductive base material with high specific surface area crush to make sufficient electrostatic capacitance difficult to be obtained, as described above.

It is an object of the present invention to provide a capacitor having a high electrostatic capacitance and high strength, including a sintered body as a conductive base material with high specific surface area.

The present inventors have intensively studied the problems described above to find that the combination use of a plurality of kinds of metal powders enables both of sufficient electrostatic capacitance and strength to be achieved without including a metal support, so that the problem of (1) can be solved; and the combination use also enables firing at relatively low temperature, so that the problem of (2) can be solved. In addition, they have found that roughening of a surface of a metal support, or provision of a low melting-point metal to the surface of the metal support enables the metal support and a sintered body to be bonded to each other with sufficient strength, so that the problem of (3) can be solved.

Accordingly, one aspect of the present invention provides a capacitor that includes a conductive base material formed of a metal sintered body and having a porous portion with a porosity of 30% or more; a dielectric layer covering at least the porous portion of the conductive base material; and an electrode covering the dielectric layer.

A second aspect, of the present invention provides a capacitor that includes a conductive base material including a metal sintered body formed from a metal powder, and a metal support on which the metal sintered body is supported by necking, the conductive base material having a porous portion with a porosity of 30% or more; a dielectric layer covering at least the porous portion of the conductive base material, the dielectric layer being formed from atoms each having an origin different from an origin of the conductive base material; and an electrode covering the dielectric layer, wherein a first average diameter of necking connecting the metal sintered body and the metal support to each other is larger than a second average diameter of necking between the metal powders in the metal sintered body.

According to the present invention, when a metal sintered body is formed together with a plurality of kinds of metal powders in a capacitor including the metal sintered body as a conductive base material with high specific surface area, sufficient electrostatic capacitance and intensity can be obtained. In addition, when the conductive base material with high specific surface area is obtained by disposing metal powders on a metal support and firing the metal powders, the metal support and the sintered body can be bonded to each other with sufficient strength by roughening a surface of the metal support, or by providing low melting-point metal to the surface of the metal support.

DETAILED DESCRIPTION OF THE INVENTION

A capacitor of the present invention will be described in detail below with reference to the drawings. However, a shape, a placement, and the like of the capacitor and each component of each embodiment are not limited to those of illustrated examples.

In the present specification, an "electrostatic capacitance forming portion" is a portion for obtaining electrostatic capacitance in the capacitor, and has a structure of electric conductor (electrode)-dielectric-electric conductor (electrode). For example, the electrostatic capacitance forming portion may have a structure of conductive base material with high specific surface area-dielectric layer-upper electrode. In addition, a portion of the conductive base material with high specific surface area, which constitutes the electrostatic capacitance forming portion, is also referred to as a "porous portion". The porous portion typically means a structural portion having a plurality of pores, but is not only limited to mean the structural portion, but also means a portion having another structure for achieving a high specific surface area.

1. Capacitor including a conductive base material with high specific surface area including no metal support.

In a first aspect, the present invention provides a capacitor including a conductive base material with high specific surface area, a dielectric layer positioned on the conductive base material with high specific surface area, and an upper electrode positioned on the dielectric layer, in which the conductive base material with high specific surface area is formed of a metal sintered body as a whole.

Figure 1:
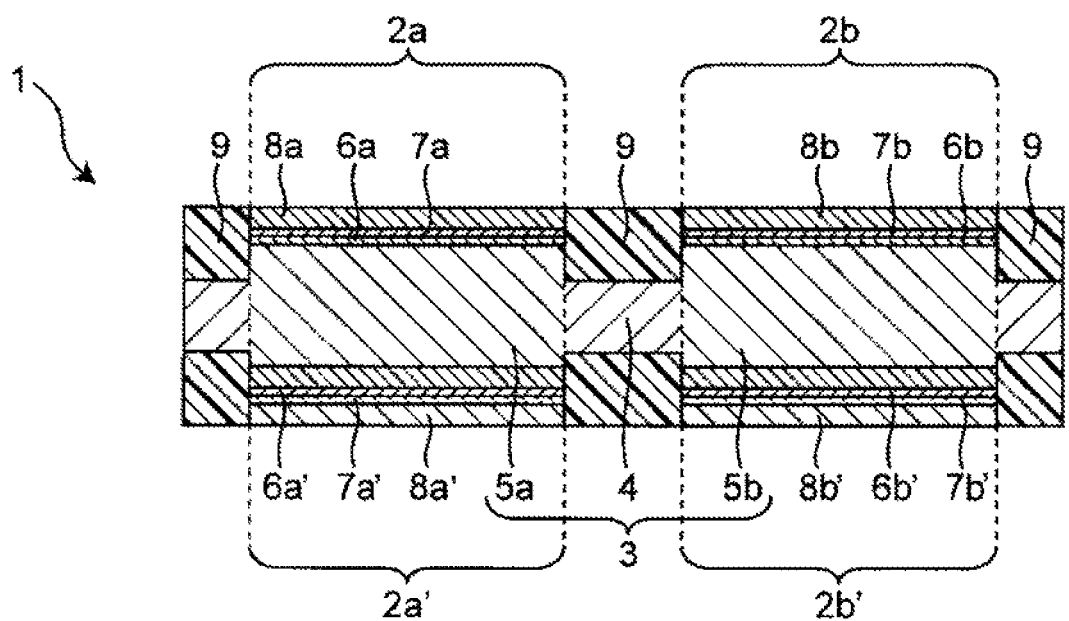
FIG. 1 is a schematic sectional view of a capacitor 1 according to an embodiment of the present invention.
Figure 2:
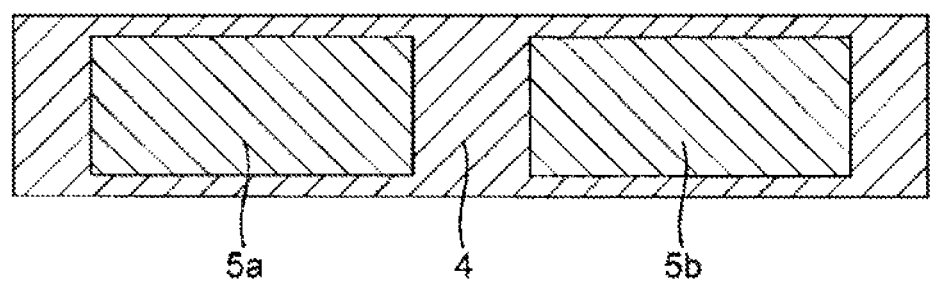
FIG. 2 is a schematic plan view of a conductive metal base material of the capacitor 1 illustrated in FIG. 1.
Figure 3:
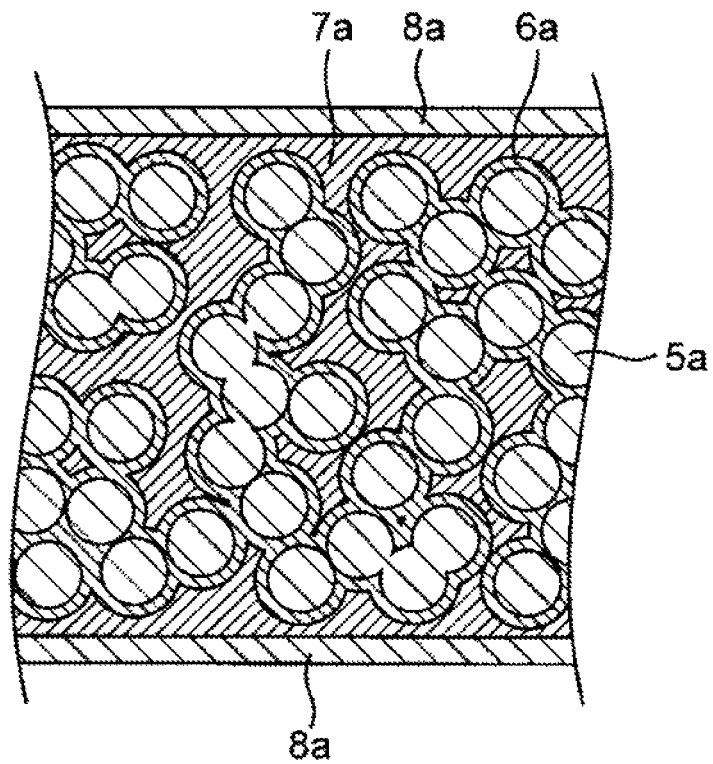
FIG. 3 is an enlarged view schematically illustrating a section of a high porosity portion of the capacitor 1 illustrated in FIG. 1.
Figure 4:
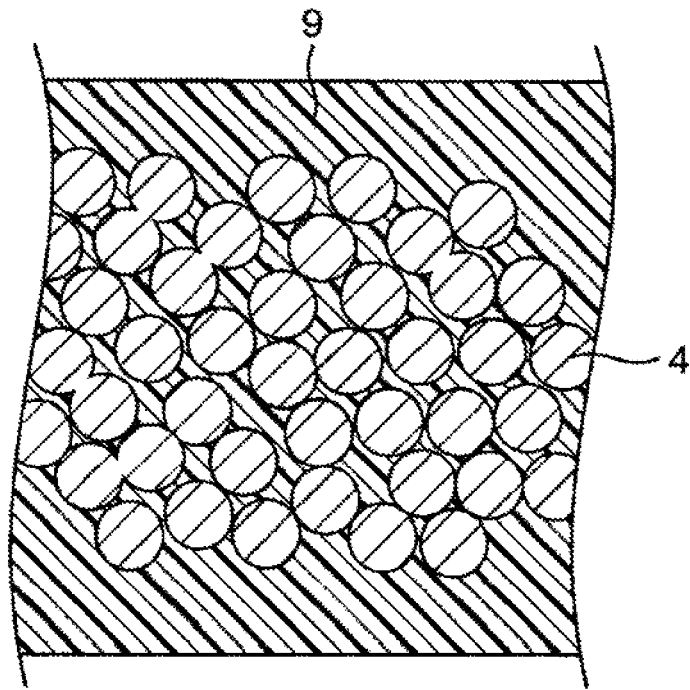
FIG. 4 is an enlarged view schematically illustrating a section of a low porosity portion of the capacitor 1 illustrated in FIG. 1.

FIG. 1 illustrates a schematic sectional view of a capacitor 1 (a porous structure of a conductive base material with high specific surface area is not illustrated for simplicity) in an embodiment, and FIG. 2 illustrates a schematic plan view of the conductive base material with high specific surface area. In addition, FIGS. 3 and 4 schematically illustrate enlarged views of sections of a high porosity portion (porous portion) and a low porosity portion of the conductive base material with high specific surface area, respectively.

As illustrated in FIGS. 1, 2, 3, and 4, the capacitor 1 of the present embodiment has a substantially rectangular parallelepiped shape. The capacitor 1 schematically has four electrostatic capacitance forming portions 2a, 2a1, 2b, and 2b'. The electrostatic capacitance forming portion 2a includes a high porosity portion 5a of a conductive base material 3 with high specific surface area, a dielectric layer 6a formed on the high porosity portion 5a, and an upper electrode 7a formed on the dielectric layer 6a. The electrostatic capacitance forming portion 2a' includes the high porosity portion 5a, a dielectric layer 6a', and an upper electrode 7a' such that the electrostatic capacitance forming portion 2a' faces the electrostatic capacitance forming portion 2a with the conductive base material 3 with high specific surface area interposed therebetween. The electrostatic capacitance forming portion 2b includes a high porosity portion 5b of the conductive base material 3 with high specific surface area, a dielectric layer 6b formed on the high porosity portion 5b, and an upper electrode 7b formed on the dielectric layer 6b. The electrostatic capacitance forming portion 2b' includes the high porosity portion 5b, a dielectric layer 6b1, and an upper electrode 7b' such that the electrostatic capacitance forming portion 2b' faces the electrostatic capacitance forming portion 2b with the conductive base material 3 with high specific surface area interposed therebetween. The conductive base material 3 with high specific surface area has high porosity portions (also referred to as porous portions) 5a and 5b each having a relatively high porosity, and a low porosity portion 4 having a relatively low porosity. The low porosity portion 4 is positioned around the high porosity portions 5a and 5b. That is, the low porosity portion 4 surrounds the high porosity portions 5a and 5b. The high porosity portions 5a and 5b each have a porous structure, and thus correspond to a porous portion. The electrostatic capacitance forming portion 2a and the electrostatic capacitance forming portion 2a' are electrically connected through the high porosity portion 5a of the conductive base material 3 with high specific surface area, and the electrostatic capacitance forming portion 2b and the electrostatic capacitance forming portion 2b' are electrically connected through the high porosity portion 5b of the conductive base material 3 with high specific surface area. In addition, the electrostatic capacitance forming portions 2a and 2a' and the electrostatic capacitance forming portions 2b and 2b' are electrically connected in series, respectively, through the low porosity portion 4 of the conductive base material 3 with high specific surface area. External electrodes 8a, 8a', 8b and 8b' are formed on the upper electrodes 7a, 7a', 7b and 7b', respectively. An insulating portion 9 is formed on the low porosity portion 4. The insulating portion 9 electrically separates the upper electrode and the external electrode of each of the electrostatic capacitance forming portions 2a and 2a' from the upper electrode and the external electrode of each of the electrostatic capacitance forming portions 2b and 2b'.

In the capacitor including a conductive base material with high specific surface area formed of a metal sintered body as described above, the conductive base material with high specific surface area is formed of the metal sintered body as a whole. As a result, many portions of the base material can be used as an electrostatic capacitance forming portion, so that a higher electrostatic capacitance density can be obtained. In addition, pores of the porous portion of the conductive base material with high specific surface area are formed so as to penetrate the base material. As a result, when a dielectric layer is formed by a gas phase method, such as an atomic layer deposition method, gas can efficiently reach fine portions of the pores to enable reduction in treatment time. Further, no support is provided, so that warping of the conductive base material with high specific surface area can be suppressed.

The capacitor including a conductive base material with high specific surface area, a dielectric layer positioned on the conductive base material with high specific surface area, an upper electrode positioned on the dielectric layer, in which the conductive base material with high specific surface area is formed of a metal sintered body as a whole, as described above, can be obtained by a method including the step of firing a mixture of at least two kinds of metal powders. For example, the capacitor is manufactured as follows.

Figure 5A:
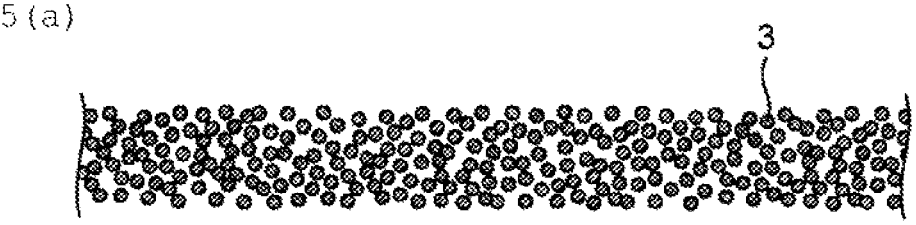
FIGS. 5(a) to 5(c) each are a schematic sectional view for describing a method for manufacturing the capacitor 1 illustrated in FIG. 1.

First, a conductive base material 3 with high specific surface area formed of a metal sintered body is prepared (FIG. 5(a)).

The conductive base material 3 with high specific surface area (that is, the metal sintered body) can be obtained by firing one or more kinds of metal powders.

In a preferable aspect, the metal sintered body can be obtained by mixing and firing at least two kinds of metal powders. When two or more kinds of metal powders are mixed and fired as described above, a conductive base material with high specific surface area having high strength can be obtained despite having no support. As a result, both of high electrostatic capacitance density and high strength can be achieved.

In the present specification, the term "metal powder" is an aggregate of metal grains, and means that the grain size distribution substantially shows one peak. That is, even a metal powder composed of the same constituent element, such as Ni, is regarded as a different metal powder if the grain size distribution is different. In addition, the shape of a metal powder is not particularly limited, and may be spherical, oval, needle-like, rod-like, wire-like, or the like.

The metal constituting the metal powder is not particularly limited as long as the metal is conductive. Examples of the metal include Al, Ti, Ta, Nb, Ni, Cu, W, Mo, Au, Ir, Ag, Rh, Ru, Co, and Fe, and alloys thereof.

The metal constituting the metal powder is preferably Ni, Cu, W, Mo, Au, Ir, Ag, Rh, Ru, Co or Fe. Use of such a metal enables reduction in equivalent series resistance (ESR) of the metal sintered body. In addition, these metals each have low specific resistance and a high melting point, so that annealing treatment can be performed at high temperature. As a result, a high-quality dielectric film can be obtained.

In an aspect, the mixture of metal powders contains at least two, for example, two, three, or four kinds of metal powders each of which has a different average grain diameter. Use of metal powders having different average grain diameters increases the strength of the sintered body even when the metal powders are fired at lower temperature.

Here, the term "average grain diameter" of metal powders means an average grain diameter D50 (grain diameter corresponding to a cumulative percentage of 50% on a volume basis). The average grain diameter D50 can be measured with a dynamic light scattering type grain size analyzer (UPA, manufactured by Nikkiso Co., Ltd.), for example.

In addition, an average grain diameter in a metal sintered body can be determined as follows: the metal sintered body is formed into a thin piece by focused ion beam (FIE) processing; a predetermined region (e.g., 5 μm×5 μm) of the thin piece sample is photographed with a transmission electron microscope (TEM); and the obtained image is analyzed by image analysis.

In a preferable aspect, a ratio of an average grain diameter of metal powders having the smallest average grain diameter in the mixture of metal powders to an average grain diameter of metal powders as a main component of the mixture of metal powders is ⅓ or less, preferably ¼ or less, and more preferably ⅕ or less. When the ratio of the average grain diameter is set as described above, sufficient mechanical strength for use as a conductive base material with high specific surface area can be secured to enable reduction in a defective rate of a capacitor. Meanwhile, the ratio of the average grain diameter of metal powders having the smallest average grain diameter in the mixture of metal powder to the average grain diameter of metal powders as a main component of the mixture of metal powders is preferably 1/30 or more, more preferably 1/20 or more, and further preferably 1/15 or more. When the ratio of the average grain diameter is set as described above, the porosity can be increased to obtain a larger electrostatic capacitance.

The content of the metal powders having the smallest average grain diameter in the mixture of metal powders can be preferably 5% by mass or more, more preferably 10% by mass or more, and further preferably 20% by mass or more, with respect to the whole of the mixture of metal powders. When the content of the metal powders having the smallest average grain diameter in the mixture of metal powders is set to 5% by mass or more, the strength of the metal sintered body further increases. Meanwhile, the content of the metal, powders having the smallest average grain diameter in the mixture of metal powders can be preferably 48% by mass or less, more preferably 40% by mass or less, and further preferably 30% by mass or less. When the content of the metal powders having the smallest average grain diameter in the mixture of metal powders is set to 48% by mass or less, more voids can be retained and a higher electrostatic capacitance can be obtained.

In another aspect, the mixture of metal powders contains at least two, for example, two, three, or four kinds of metal powders each of which has a different melting point. Use of metal powders having different melting points increases the strength of the sintered body even when the metal powders are fired at lower temperature.

In a preferable aspect, in the mixture of metal powders, a melting point of a metal constituting at least one kind of a metal powder is 100° C. or more lower than a melting point of a metal constituting metal powders as a main component of the metal sintered body, more preferably 150° C. or more lower, and further preferably 200° C. or more lower. When metal powders having different melting points are used as described above, firing progresses with low melting metal powders even when the metal powders are fired at lower temperature. As a result, a metal sintered body having sufficient porosity and strength can be obtained.

Examples of the combination of the metal powders as the main component of the metal sintered body and the metal powders having a low melting point include, but are not particularly limited to, a combination of Ni and Cu.

Figure 5B:
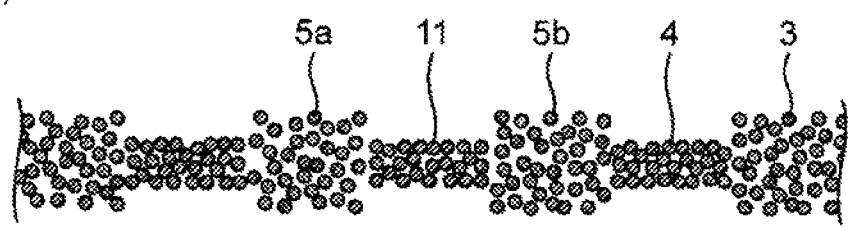

Next, a groove 11 is formed in the conductive base material 3 with high specific surface area obtained as described above (FIG. 5(b)). The groove corresponds to the low porosity portion 4, and other portions correspond to the high porosity portions 5a and 5b (hereinafter collectively referred to also as "high porosity portions 5").

In the present specification, the term "high porosity portion" means a portion having a higher porosity and a larger specific surface area than a low porosity portion of a conductive base material with high specific surface area, and the "high porosity portion" constitutes an electrostatic capacitance forming portion in the present application. The high porosity portion 5 increases the specific surface area of the conductive base material 3 with high specific surface area and increases the electrostatic capacitance of the capacitor 1.

From the viewpoint of increasing the specific surface area to further increase the electrostatic capacitance of the capacitor, the porosity of the high porosity portion 5 can be preferably 30% or more, and more preferably 40% or more. In addition, from the viewpoint of securing mechanical strength, the porosity thereof is preferably 90% or less, and more preferably 80% or less.

In the present specification, the term "porosity" refers to a proportion of voids occupied in a conductive base material with high specific surface area. The porosity can be measured as follows. While voids of the conductive base material with high specific surface area can be finally filled with the dielectric layer, the upper electrode, or the like in the process of preparing the capacitor, the above "porosity" is calculated by considering a filled portion as a void without reference to a substance filled as described above.

First, the conductive base material with high specific surface area is formed into a thin piece by a focused ion beam (FIB) processing. A predetermined region (e.g., 5 μm×5 μm) of the thin piece sample is photographed using a transmission electron microscope (TEM). Image analysis of the obtained image is performed to determine an area of metal existing in the conductive base material with high specific surface area. Then, porosity can be calculated from the following equation.

Porosity (%)=((measurement area-area of metal existing in base material)/measurement area)× 100

The low porosity portion 4 can be formed by crushing (or filling) some pores of the metal sintered body obtained as described above. Examples of the method for crushing (filling) pores include, but are not particularly limited to, a method for melting metal by laser irradiation or the like to crush pores, and a method for crushing pores by being compressed by die processing or press working. The laser is not limited, and includes a $CO_2$ laser, a YAG laser, an excimer laser, and an all-solid pulsed laser such as a femtosecond laser, a picosecond laser, and a nanosecond laser. The all-solid pulsed laser such as a femtosecond laser, a picosecond laser, and a nanosecond laser is preferable because it can more finely control a shape and porosity.

The porosity of the low porosity portion 4 is preferably 25% or less, and more preferably 15% or less. In addition, the low porosity portion may have a porosity of 0%. That is, the low porosity portion may or may nor have a void. As the low porosity portion decreases in porosity, the capacitor increases in mechanical strength.

The low porosity portion is not an indispensable element in the present invention, and may not be provided. For example, the low porosity portion 4 may not be provided in FIG. 1, and a high porosity portion may be provided in place of the low porosity portion 4. In this case, however, the upper electrode, the external electrode, and the like are not formed on the high porosity portion provided in place of the low porosity portion and an insulating portion is formed thereon.

In the present embodiment, while the conductive base material 3 with high specific surface area is composed of the high porosity portion 5 and the low porosity portion 4 provided around the high porosity portion 5, the present invention is not limited to this structure. That is, the high porosity portion and the low porosity portion are not particularly limited in existing position, the number of disposition, size, shape, ratio of the both portions, and the like. For example, the conductive base material with high specific surface area may be composed of only a high porosity portion. In addition, electrostatic capacitance of the capacitor can be controlled by adjusting a ratio of the high porosity portion and the low porosity portion.

The thickness of the high porosity portion 5 is not particularly limited, and can be appropriately determined depending on an object. For example, the thickness may be 5 μm or more, preferably 20 μm or more, and preferably 1000 μm or less, more preferably 300 μm or less, and further preferably 50 μm or less, for example. The thickness of the high porosity portion means the thickness of the high porosity portion when assuming that all pores are filled.

Figure 5C:
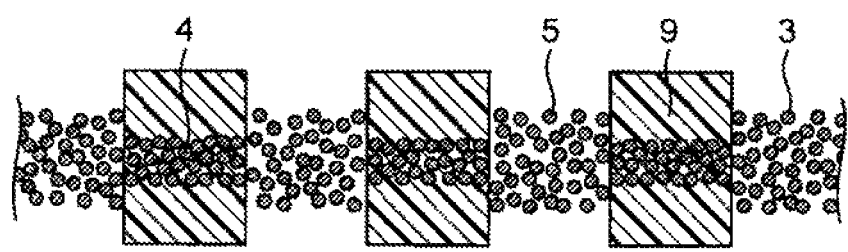

Next, a resin is injected onto the low porosity portion 4 (into the groove 11) to form the insulating portion 9 (FIG. 5(c)). The insulating portion 9 is formed so as to fill voids inside the low porosity portion 4, When the voids inside the low porosity portion 4 are filled as described above, the dielectric layer and the upper electrode described below can be prevented from being formed on the low porosity portion. Thus, the insulating portion 9 functions so as to electrically separate upper electrodes and external electrodes of respective electrostatic capacitance forming portions adjacent to each other.

While the material forming the insulating portion 9 is not particularly limited as long as it has insulating properties, resin with heat resistance is preferable when an atomic layer deposition method is used later. As an insulating material forming the insulating portion 9, various kinds of glass material, ceramic material, polyimide resin, and fluorine resin, are preferable.

The insulating portion 9 is formed by applying the insulating material. Examples of the method for applying the insulating material include an air type dispenser, a jet dispenser, screen printing, electrostatic coating, inkjet, photolithography, and the like.

The insulating portion 9 is not an indispensable element in the capacitor of the present invention, and may not be provided.

Figure 5D:
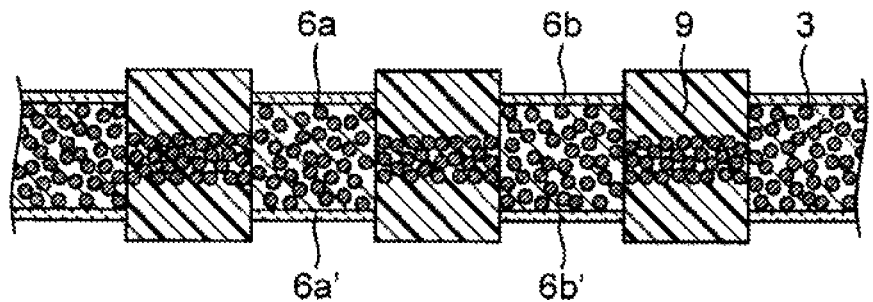
FIGS. 5(d) to 5(g) each are a schematic sectional view for describing the method for manufacturing the capacitor 1 illustrated in FIG. 1.

Next, dielectric layers 6a, 6a', 6b, and 6b' (hereinafter collectively referred to also as "dielectric layer 6") are formed on the high porosity portion 5 (FIG. 5(d)).

The dielectric layer is preferably formed by a gas phase method such as a vacuum deposition method, a chemical vapor deposition (CVD) method, a sputtering method, an atomic layer deposition (ALD) method, a pulsed laser deposition (PLD) method, or the like, or a method using a supercritical fluid. The ALD method is more preferable because a more homogeneous and dense film can be formed even in a fine portion of a pore in the high porosity portion.

While the material forming the dielectric layer 6 is not particularly limited as long as it has insulating properties, metallic oxides such as $AlO_x$ (e.g., $Al_2O_3$), $SiO_x$ (e.g., $SiO_2$), $AlTiO_x$, $SiTiO_x$, $HfO_x$, $TaO_x$, $ZrO_x$, $HfSiO_x$, $ZrSiO_x$, $TiZrO_x$, $TiZrWO_x$, $TiO_x$, $SrTiO_x$, $PbTiO_x$, $BaTiO_x$, $BaSrTiO_x$, $BaCaTiO_x$, and $SiAlO_x$; metallic nitrides such as $AlN_x$, $SiN_x$, and $AlScN_x$; and metallic oxynitrides such as $AlO_xN_y$, $SiO_xN_y$, $HfSiO_xN_y$, and $SiC_xO_yN_2$ are preferable, and $AlO_x$, $SiO_x$, $SiO_xN_y$, and $HfSiO_x$ are more preferable. The formula described above simply expresses structure of the material, and thus does not limit composition thereof. That is, x, y, and z attached to O and K may be any value greater than zero, and an abundance ratio of each element including a metal element is arbitrary. Alternatively, the dielectric layer may be a layered compound composed of a plurality of different layers.

The thickness of the dielectric layer is not particularly limited, and is preferably 3 nm or more and 100 nm or less, and more preferably 5 nm or more and 50 nm or less, for example. When the thickness of the dielectric layer is set to 3 nm or more, insulating properties can be enhanced to reduce leakage current. When the thickness of the dielectric layer is set to 100 nm or less, larger electrostatic capacitance can be obtained. The dielectric layers 6a and 6b may be formed on the insulating portion 9.

Figure 5E:
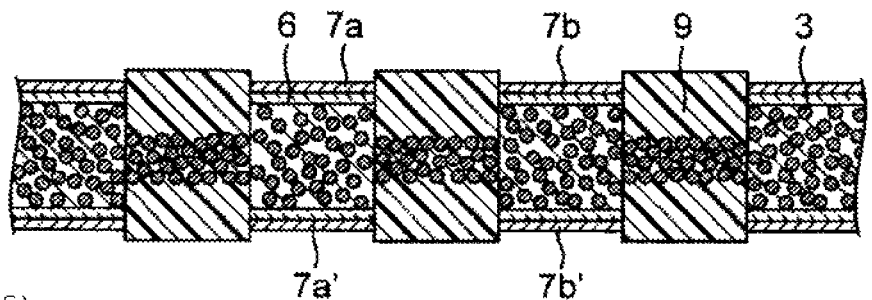

Next, upper electrodes 7a, 7a', 7b, and 7b' (hereinafter collectively referred to also as "upper electrode 7") are formed on the dielectric layers 6a, 6a', 6b, and 6b', respectively (FIG. 5(e)).

The upper electrode may be formed by an ALD method. When the ALD method is used, the electrostatic capacitance of the capacitor can be increased. Alternatively, the upper electrode may be formed by a method such as a chemical vapor deposition (CVD) method, plating, bias sputtering, a Sol-Gel method, and filling with an electroconductive polymer, which can cover the dielectric layer and can substantially fill pores of the base material. Preferably, the upper electrode may be formed as follows: a conductive film is formed on the dielectric layer by the ALD method; and pores are filled with a conductive material, preferably a substance with a lower electrical resistance, from above the conductive film by another method. When this kind of structure is formed, a higher electrostatic capacitance density and a lower equivalent series resistance (ESR) can be efficiently obtained.

While a material constituting the upper electrode 7 is not particularly limited as long as being conductive, Ni, Cu, Al, W, Ti, Ag, Au, Pt, Zn, Sn, Pb, Fe, Cr, Mo, Ru, Pd, and Ya; and alloys thereof such as CnNi, AuNi, and AuSn; metal nitrides and metal oxynitrides such as TiN, TiAlN, YiON, TiAlON and TaN; conductive polymers such as poly-3,4-ethylenedioxythiophene (PEDOT), polypyrrole, and polyaniline; and the like, are preferable, and TiN and TiON are more preferable.

The thickness of the upper electrode is not particularly limited, and is preferably 3 nm or more, and more preferably 10 nm or more, for example. When the thickness of the upper electrode is set to 3 nm or more, the resistance of the upper electrode itself can be reduced.

When the upper electrode does not have sufficient-conductivity as a capacitor electrode after being formed, an extended electrode layer composed of Al, Cu, Ni, and the like may be additionally formed on a surface of the upper electrode by a method such as sputtering, vapor deposition, or plating.

In addition, it is preferable that the upper electrode layers 7a and 7b and the extended electrode layer are formed such that they are not formed on the insulating portion 9. For example, a mask may be formed beforehand on the insulating portion 9 so that the upper electrode layers 7a and 7b and the extended electrode layer are not formed on the insulating portion 9. Thereafter, the upper electrode layers 7a and 7b and the extended electrode layer are formed, and then the mask, and the upper electrode layers 7a and 7b and the extraction electrode layer on the mask may be removed. When the upper electrode layer or the extended electrode layer is formed on the insulating portion 9, the upper electrode layer and the extended electrode layer can be removed by laser or grinding, for example. Alternatively, the upper electrode layer and the extraction electrode layer can be removed by etching treatment with a chemical solution.

Figure 5F:
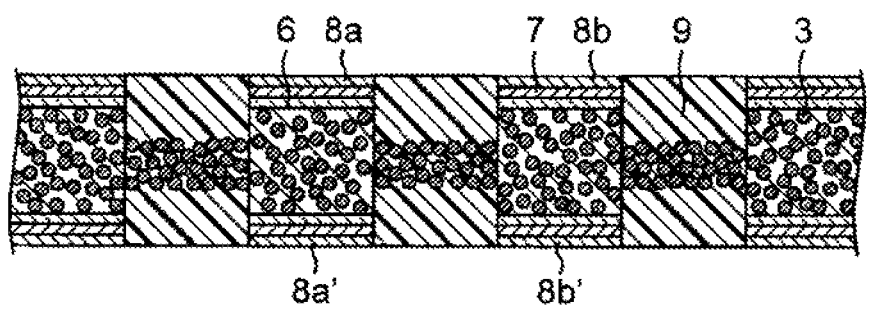

Next, external electrodes 8a, 8a', 8b, and 8b' (hereinafter collectively referred to also as "external electrode 8") are formed on the upper electrodes 7a, 7a', 7b, and 7b', respectively (FIG. 5(f)).

A method for forming the external electrode 8 is not particularly limited, and a CVD method, electrolytic plating, electroless plating, vapor deposition, sputtering, baking of a conductive paste, and the like can be used, for example, and electrolytic plating, electroless plating, vapor deposition, sputtering, and the like are preferable.

While a material constituting the external electrode 8 is not particularly limited, a metal such as Au, Pb, Pd, Ag, Sn, Ni, and Cu, and alloys thereof, and a conductive polymer are preferable, for example.

The external electrode 8 is not an indispensable element and may not be provided. In this case, the upper electrode 7 also functions as an external electrode. That is, the upper electrode 7a and the upper electrode 7b may function as a pair of electrodes. In this case, the upper electrode 7a may function as an anode and the upper electrode 7b may function as a cathode. Alternatively, the upper electrode 7a may function as a cathode and the upper electrode 7b may function as an anode.

Figure 6:
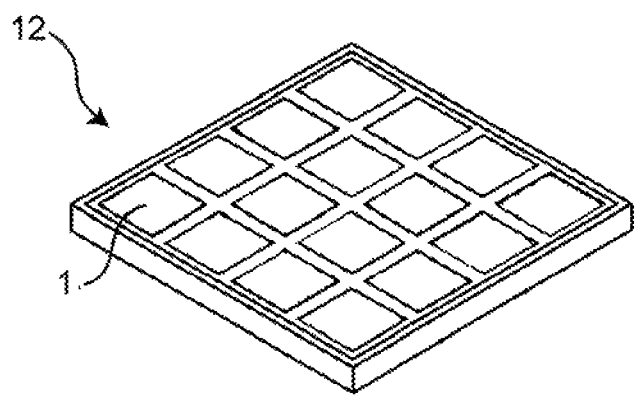
FIG. 6 is a schematic perspective view of a collective board illustrated in FIG. 5(f).

The substrate obtained as described above constitutes a capacitor collective board 12 in which a plurality of the capacitors 1 according to the present embodiment are connected with a conductive base material with high specific surface area and are disposed in a matrix form (FIG. 6).

Accordingly, the present invention also provides a capacitor collective board in which the plurality of the capacitors of the present invention are connected with a conductive base material with high specific surface area.

Figure 5G:
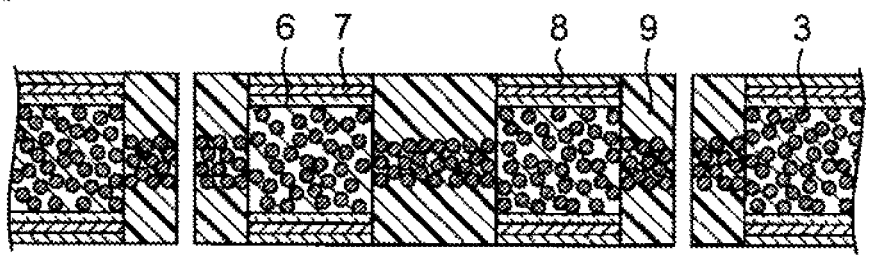

Next, the obtained capacitor collective board 12 is divided into individual parts by fully cutting the central portion of the insulating portion 9 (FIG. 5(g)).

The cutting described above can be performed by using various kinds of laser equipment, a dicer, various blades, and a die, and it is preferable to use laser equipment, particularly fiber laser equipment or nanosecond laser equipment.

The capacitor 1 obtained as described above includes a conductive base material with high specific surface area, a dielectric layer positioned, on the conductive base material with high specific surface area, and an upper electrode positioned on the dielectric layer. The conductive base material with high specific surface area is provided with first, second, third, and fourth electrostatic capacitance forming portions each composed of the conductive base material with high specific surface area, the dielectric layer, and the upper electrode. The first electrostatic capacitance forming portion and the second electrostatic capacitance forming portion are disposed on one principal surface of the conductive base material with high specific surface area, the third electrostatic capacitance forming portion and the fourth electrostatic capacitance forming portion are disposed on the other principal surface of the conductive base material with high specific surface area. The first electrostatic capacitance forming portion and the third electrostatic capacitance forming portion are positioned facing each other with the conductive base material with high specific surface area interposed between the first electrostatic capacitance forming portion and the third electrostatic capacitance forming portion, and the second electrostatic capacitance forming portion and the fourth electrostatic capacitance forming portion are positioned facing each other with the conductive base material with high specific surface area interposed between the second electrostatic capacitance forming portion and the fourth electrostatic capacitance forming portion.

While the capacitor 1 of the present embodiment is described above, various modifications can be made to the capacitor of the present invention.

In the present embodiment, for example, while the capacitor has a substantially rectangular parallelepiped shape, the present invention is not limited to this. The capacitor of the present invention can have any shape, and may have a planar shape of a circle, an ellipse, a rectangle with rounded corners, or the like, for example.

While the conductive base material with high specific surface area is provided on its both principal surface sides with the electrostatic capacitance forming portions in the present embodiment, the electrostatic capacitance forming portion may be provided only on one of the principal surface sides. That is, the electrostatic capacitance forming portions 2a' and 2b' on the lower surface side of FIG. 1 may not be provided, and the insulating portion 9 may be provided instead. In addition, any one of the external electrodes 8a and 8a' of the four external electrodes 8a, 8a', 8b, and 8b' may not be provided, and the insulating portion 9 may be provided instead. Any one of the external electrodes 8b and 8b' may not be provided, and the insulating portion 9 may be provided instead.

That is, the capacitor as described above includes a conductive base material with high specific surface area, a dielectric layer positioned on the conductive base material with high specific surface area, and an upper electrode positioned on the dielectric layer, in which the conductive base material with high specific surface area is provided on its one principal surface with first and second electrostatic capacitance forming portions each composed of the conductive base material with high specific surface area, the dielectric layer, and the upper electrode, and the conductive base material with high specific surface area is provided on its other principal surface with an insulating portion.

In addition, a layer for increasing adhesion between layers and a buffer layer for preventing diffusion of components between the respective layers may be provided between the respective layers. Further, a protective layer may be provided on a side surface of the capacitor or the like.

2. Capacitor including conductive base material with high specific surface area including metal support and metal sintered body supported by the same In a second aspect, of the present invention, there is provided a capacitor that includes a conductive base material with high specific surface area, a dielectric layer positioned on the conductive base material with high specific surface area, and an upper electrode positioned on the dielectric layer. The conductive base material with high specific surface area includes a metal sintered body and a metal support, and the metal sintered body is supported by the metal support.

Figure 7:
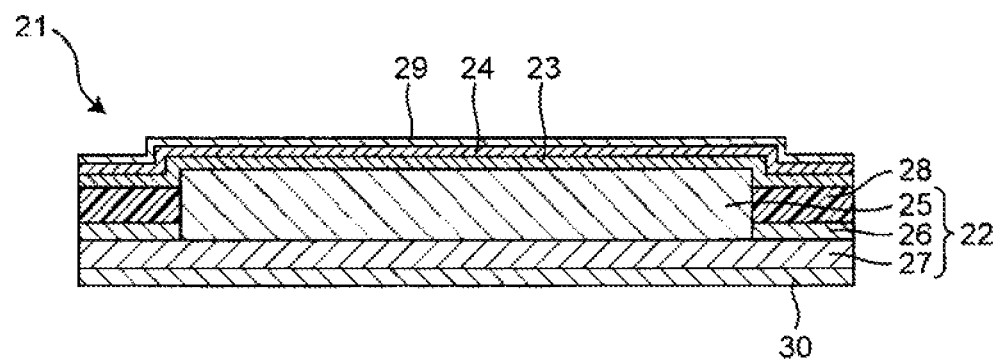
FIG. 7 is a schematic sectional view of a capacitor 21 according to another embodiment of the present invention.
Figure 8:
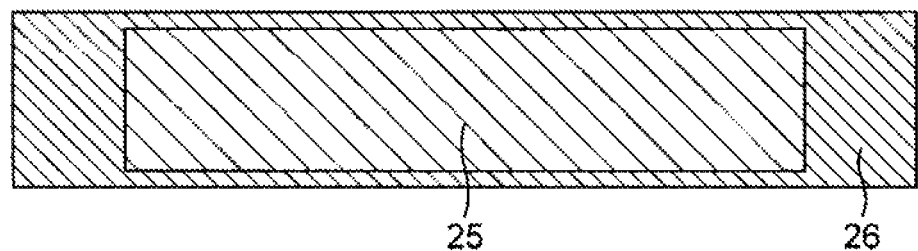
FIG. 8 is a schematic plan view of a conductive metal base material of the capacitor 21 illustrated in FIG. 7.

FIG. 7 illustrates a schematic sectional view of a capacitor 21 (a void is not illustrated for simplicity) in an embodiment, and FIG. 8 illustrates a schematic plan view of a conductive base material with high specific surface area. In addition, FIG. 9 schematically illustrates an enlarged view of a section of a high porosity portion of the conductive base material with high specific surface area.

Figure 9:
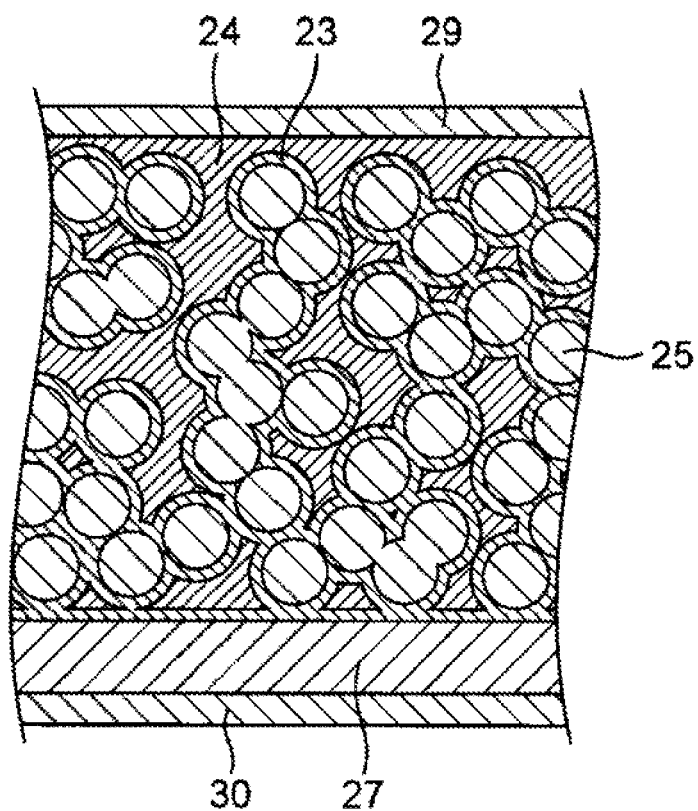
FIG. 9 is an enlarged view schematically illustrating a section of a high porosity portion of the capacitor 21 illustrated in FIG. 7.

As illustrated in FIGS. 7, 8, and 9, the capacitor 21 of the present embodiment has a substantially rectangular parallelepiped shape, and schematically includes a conductive base material 22 with high specific surface area, a dielectric layer 23 formed on the conductive base material 22 with high specific surface area, and an upper electrode 24 formed on the dielectric layer 23. The conductive base material 22 with high specific surface area is provided on its one principal surface side with a high porosity portion 25 having a relatively high porosity and a low porosity portion 26 having a relatively low porosity. The high porosity portion 25 is positioned at the central portion of a first principal surface of the conductive base material 22 with high specific surface area, and the low porosity portion 26 is positioned around the high porosity portion 25. That is, the low porosity portion 26 surrounds the high porosity portion 25. The high porosity portion 25 has a porous structure. In addition, the conductive base material 22 with high specific surface area has a metal support portion 27 on its other principal surface (second principal surface) side. That is, the high porosity portion 25 and the low porosity portion 26 constitute the first principal surface of the conductive base material 22 with high specific surface area, and the support portion 27 constitutes the second principal surface of the conductive base material 22 with high specific surface area. In FIG. 7, the first principal surface is an upper surface of the conductive base material 22 with high specific surface area, and the second principal surface is a lower surface of the conductive base material 22 with high specific surface area. At an end portion of the capacitor 21, an insulating portion 28 is provided, between the low porosity portion 26 and the dielectric layer 23. The capacitor 21 includes a first external electrode 29 on the upper electrode 24 and a second external electrode 30 on the principal surface of the conductive base material 22 with high specific surface area on the support portion 27 side. In the capacitor 21 of the present embodiment, the first external electrode 29 and the upper electrode 24 are electrically connected to each other, and the second external electrode 30 and the support portion 27 are electrically connected to each other. The upper electrode 24 and the high porosity portion 25 of the conductive base material 22 with high specific surface area face each other with the dielectric layer 23 interposed between the upper electrode 24 and the high porosity portion 25. When the upper electrode 24 and the conductive base material 22 with high specific surface area are energized, charge can be accumulated in the dielectric layer 23.

The conductive base material with high specific surface area including the metal support and the metal sintered body supported by the metal support has high strength, and is less likely to cause troubles such as occurrence of cracks in the dielectric layer.

The capacitor as described above including a conductive base material with high specific surface area, a dielectric layer positioned on the conductive base material with high specific surface area, and an upper electrode positioned on the dielectric layer, in which the conductive base material with high specific surface area includes a metal sintered body and a metal support supporting the metal sintered body, can be obtained by a method including the steps of: disposing metal powders or a mixture of metal powders on the metal support; and firing the metal support with the metal powders or the mixture of metal powders to prepare the conductive base material with high specific surface area. For example, the capacitor is manufactured as follows.

First, a conductive base material with high specific surface area formed of a metal sintered body and a metal support for supporting the metal sintered body is prepared.

The conductive base material with high specific surface area can be obtained by disposing metal powders or a mixture of metal powders on the metal support and then firing them.

Examples of the metal constituting the metal support include, but are not particularly limited to, Al, Ti, Ta, Nb, Ni, Cu, W, Mo, Au, Ir, Ag, Rh, Ru, Co, and Fe, and an alloy thereof. The metal constituting the metal support is preferably Ni, Cu, W, Mo, Au, Ir, Ag, Rh, Ru, Co or Fe. Use of such a metal enables reduction in equivalent series resistance (ESR). In addition, these metals each have low specific resistance and a high melting point, so that annealing treatment can be performed at high temperature. As a result, a high-quality dielectric film can be obtained.

The mixture of metal powders disposed on the conductive base material with high specific surface area may be the same as the mixture of metal powders used in the capacitor 1 described above.

The metal constituting the metal powder is not particularly limited as long as the metal is conductive. Examples of the metal include Al, Ti, Ta, Nb, Ni, Cu, W, Mo, Au, Ir, Ag, Rh, Ru, Co, and Fe, and alloys thereof.

The metal constituting the metal powder is preferably Ni, Cu, W, Mo, Au, Ir, Ag, Rh, Ru, Co or Fe. Use of such a metal enables reduction in equivalent series resistance (ESR) of the metal sintered body. In addition, these metals each have low specific resistance and a high melting point, so that annealing treatment can be performed at high temperature. As a result, a high-quality dielectric film can be obtained.

In an aspect, the mixture of metal powders contains at least two, for example, two, three, or four kinds of metal powders each of which has a different average grain diameter. Use of metal powders having different average grain diameters increases the strength of the sintered body even when the metal powders are fired at lower temperature.

In a preferable aspect, a ratio of an average grain diameter of metal powders having the smallest average grain diameter in the mixture of metal powders to an average grain diameter of metal powders as a main component of the mixture of metal powders is 1/3 or less, preferably 1/4 or less, and more preferably 1/5 or less. When the ratio of the average grain diameter is set as described above, sufficient mechanical strength for use as a conductive base material with high specific surface area can be secured to enable reduction in a defective rate of a capacitor. Meanwhile, the ratio of the average grain diameter of metal powders having the smallest average grain diameter in the mixture of metal powder to the average grain diameter of metal powders as a main component of the mixture of metal powders is preferably 1/30 or more, more preferably 1/20 or more, and further preferably 1/15 or more. When the ratio of the average grain diameter is set as described above, the porosity can be increased to obtain a larger electrostatic capacitance.

The content of the metal powders having the smallest average grain diameter in the mixture of metal powders can be preferably 5% by mass or more, more preferably 10% by mass or more, and further preferably 20% by mass or more. When the content of the metal powders having the smallest average grain diameter in the mixture of metal powders is set to 5% by mass or more, the strength of the metal sintered body further increases. Meanwhile, the content of the metal powders having the smallest average grain diameter in the mixture of metal powders can be preferably 48% by mass or less, more preferably 40% by mass or less, and further preferably 30% by mass or less. When the content of the metal powders having the smallest average grain diameter in the mixture of metal powders is set to 48% by mass or less, more voids can be retained and a higher electrostatic capacitance can be obtained.

In another aspect, the mixture of metal powders contains at least two, for example, two, three, or four kinds of metal powders each of which has a different melting point. Use of metal powders having different melting points increases the strength of the sintered body even when the metal powders are fired at lower temperature.

In a preferable aspect, in the mixture of metal powders, a melting point of a metal constituting at least one kind of a metal powder is 100° C. or more lower, more preferably 150° C. or more lower, and further preferably 200° C. or more lower than a melting point of a metal constituting metal powders as a main component of the metal sintered body. When metal powders having different melting points are used as described above, firing progresses with low melting metal powders even when the metal powders are fired at lower temperature. As a result, a metal sintered body having sufficient porosity and strength can be obtained.

Examples of the combination of the metal powders as the main component of the metal sintered body and the metal powders having a low melting point include, but are not particularly limited to, a combination of Ni and Cu.

In a preferable aspect, the conductive base material with high specific surface area is obtained by roughening a surface of the metal support, disposing the metal powders or the mixture of metal powders on the surface thereof, and then firing them.

Examples of the method for roughening the surface of the metal support includes chemical methods such as etching using a sulfuric acid-hydrogen peroxide type etching agent, a nitric acid type etching agent, and the like, and physical methods such as sandblasting and filing.

The roughened surface of the metal support has irregularities, and an average distance between recesses in the surface of the metal support in its in-plane direction can be preferably 1/30 or more, more preferably 1/20 or more, and further preferably 1/15 or more, and can be preferably 1/2 or less, more preferably 1/3 or less, and further preferably 1/4 or less, of an average grain diameter of the metal powders or an average grain diameter of metal powders as a main component of the mixture of metal powders to be disposed on the surface thereof. When a short side length of the irregularities on the surface of the metal support is set within such a range, the metal support and the metal sintered body can be more firmly bonded to each other.

The average distance between recesses in the surface of the metal support in its in-plane direction can be obtained by drawing two straight lines on a predetermined region (e.g., 3 μm×3 μm) to divide the region into four squares and measuring distances between recesses on the straight lines using a scanning probe microscope (SPM) to obtain an average value of the distances as the average distance.

In true conductive bass material with high specific surface area obtained in the present aspect, an average diameter of necking (that is, necking between the metal powders constituting the metal sintered body and the metal support) connecting the metal sintered body and the metal support is larger than an average diameter of necking between the metal powders in the metal sintered body.

Figure 12:
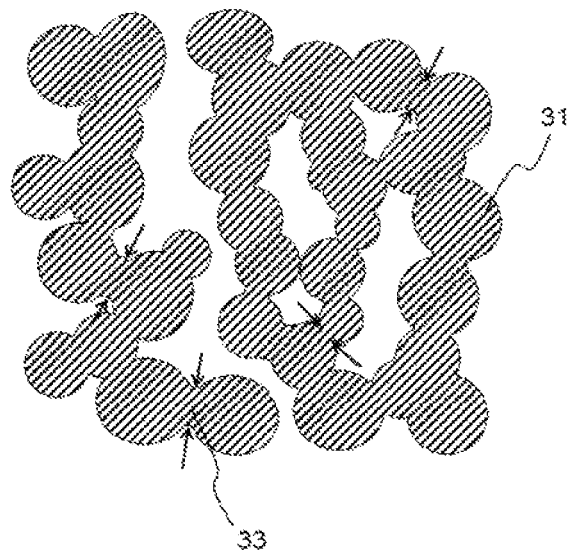
FIG. 12 schematically illustrates a section of a metal sintered body for describing an average diameter of necking of the metal sintered body in the present invention.
Figure 13:
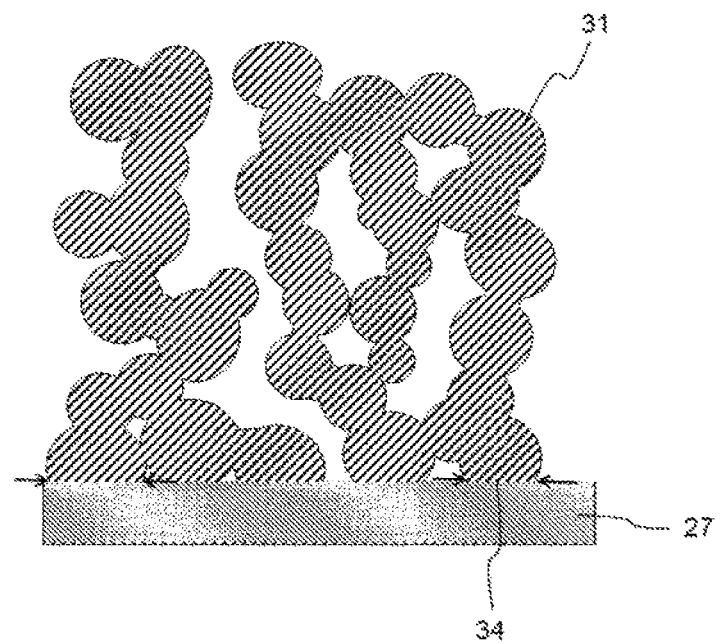
FIG. 13 schematically illustrates a section of a conductive base material with high specific surface area for describing an average diameter of necking between the metal sintered body and the metal support in the present invention.

The average diameter of necking can be obtained by photographing a predetermined region of a thin piece sample obtained by FIB processing with use of TEM, and analyzing the obtained image by image analysis. That is, the minimum width of the necking portions in each of which the metal powder and the metal support, or the metal powders themselves, are connected to each other, is measured and defined as an average of measured values of 20 necking portions. The 20 necking portions each have a large measured value in 50 necking portions that are randomly selected. For example, an average diameter of necking between metal powders themselves is an average value of the narrowest portions of a necking portion 33 between grains in a metal sintered body 31 as indicated by arrows in FIG. 12. In addition, an average diameter of necking between metal powders and a metal support is an average value of the narrowest portions of a necking portion 34 between grains in the metal sintered body 31 and the metal support 27 as indicated by arrows in FIG. 13.

In a preferable aspect, a conductive base material with high specific surface area is obtained by disposing first metal powders on a metal support, disposing second metal powders or a mixture of metal powders thereon, and then firing them.

The second metal powders or the mixture of metal, powders correspond(s) to the metal powders and the mixture of metal powders in the aspect described above, and the first metal powders are metal powders different from those above.

The metal constituting the first metal powder is not particularly limited as long as being conductive. Examples of the metal include Al, Ti, Ta, Nb, Ni, Cu, W, Mo, Au, Ir, Ag, Rh, Ru, Co, and Fe, and an alloy thereof.

In an aspect, an average grain diameter of the first metal powders is ½ or less, preferably ⅓ or less, more preferably ¼ or less, and further preferably ⅕ or less, of an average grain diameter of the second metal powders or metal powders as a main component of the mixture of metal powders. In addition, the average grain diameter of the first metal powders is preferably 1/30 or more, more preferably 1/20 or more, and further preferably 1/15 or more, of the average grain diameter of the second metal powders or metal powders as a main component, of the mixture of metal powders. When the average grain diameter of the first metal powders is set to within such a range, the metal sintered body and the metal support can be more firmly bonded to each other.

In the conductive base material with high specific surface area obtained in the present aspect, an average diameter of necking connecting the metal sintered body and the metal support is larger than an average diameter of necking in a substantially central portion of the metal sintered body.

In an aspect, a melting point of a metal constituting the first metal powders is 100° C. or more lower, more preferably 150° C. or more lower, and further preferably 200° C. or more lower than a melting point of a metal constituting the second metal powders or metal powders as a main component of the mixture of metal powders. When a metal having a low melting point is selected as the metal constituting the first metal powders, the metal support and the metal sintered body can be more firmly bonded to each other.

In the conductive base material with high specific surface area obtained in the present aspect, a metal with a melting point of 100° C. or more lower, more preferably 150° C. or more lower, and further preferably 200° C. or more lower than a melting point of a metal constituting the substantially central portion of the metal sintered body is provided in the vicinity of an interface between the metal sintered body and the metal support.

In a preferable aspect, the melting point of the metal constituting the first metal powder is 100° C. or more lower, more preferably 150° C. or more lower, and further preferably 200° C. or more lower than a melting point of the metal constituting the metal support.

In the conductive base material with high specific surface area obtained in the present aspect, a metal with a melting point of 100° C. or more lower, more preferably 150° C. or more lower, and further preferably 200° C. or more lower than the melting point of the metal constituting the metal support is provided in the vicinity of the interface between the metal sintered body and the metal support.

In the present aspect, the first metal powder is preferably Cu. In addition, while the combination of the first metal powders and the second metal powders or metal powders as a main component of the mixture of metal powders is not particularly limited, a combination of Ni and Cu is preferable, for example.

The first metal powders are disposed on the conductive base material with high specific surface area as a layer with a thickness of preferably 0.3 μm or more, more preferably 1 μm or more, and further preferably 3 μm or more. When the layer of the first metal powders has a thickness of 1 μm or more, the metal sintered body and the metal support can be more firmly bonded to each other. In addition, the first metal powders are disposed, on the conductive base material with high specific surface area, as a layer with a thickness of preferably 50 μm or less, more preferably 30 μm or less, and further preferably 10 μm or less. When the layer of the first metal powder has a thickness of 30 μm or less, electrostatic capacitance can be more increased.

In a preferable aspect, a conductive base material with high specific surface area is obtained by forming a low melting-point metal layer on a metal support, disposing metal powders or a mixture of metal powders on the low melting-point metal layer, and then firing them.

A melting point of a metal constituting the low melting-point metal layer is 100° C. or more lower, more preferably 150° C. or more lower, and further preferably 200° C. or more lower than a melting point of a metal constituting the metal powders or metal powders as a main component of the mixture of metal powders disposed on the low melting-point metal layer. When a metal having a low melting point is selected as the metal constituting the low melting-point metal layer, the metal support and the metal sintered body can be more firmly bonded to each other.

Examples of the metal constituting the low melting-point metal layer include Al, Ti, Ta, Nb, Ni, Cu, W, Mo, Au, Ir, Ag, Rh, Ru, Co, and Fe, and an alloy thereof.

The thickness of the low melting-point metal layer is preferably 0.3 μm or more, more preferably 1 μm or more, and further preferably 3 μm or more. When the low melting-point metal layer has a thickness of 1 μm or more, the metal support and the metal sintered body can be more firmly bonded to each other. In addition, the thickness of the low melting-point metal layer is preferably 50 μm or less, more preferably 30 μm or less, and further preferably 10 μm or less. When the low melting-point metal layer has a thickness of 30 μm or less, electrostatic capacitance can be more increased.

In the conductive base material with high specific surface area obtained in the present aspect, a metal with a melting point of 100° C. or more lower, more preferably 150° C. or more lower, and further preferably 200° C. or more lower than a melting point of a metal constituting the substantially central portion of the metal sintered body is provided in the vicinity of an interface between the metal sintered body and the metal support.

Figure 10A:
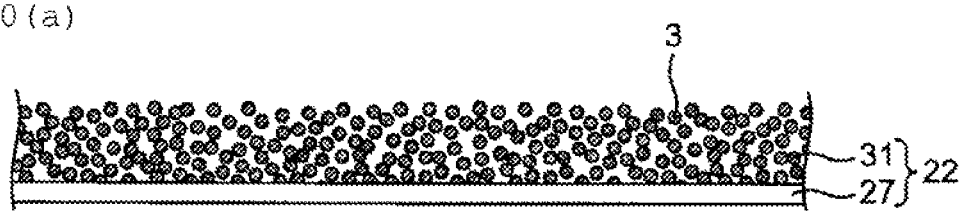
FIGS. 10(a) and 10(b) each are a schematic sectional view of a conductive metal base material composed of a metal support and a metal sintered body.
Figure 10B:
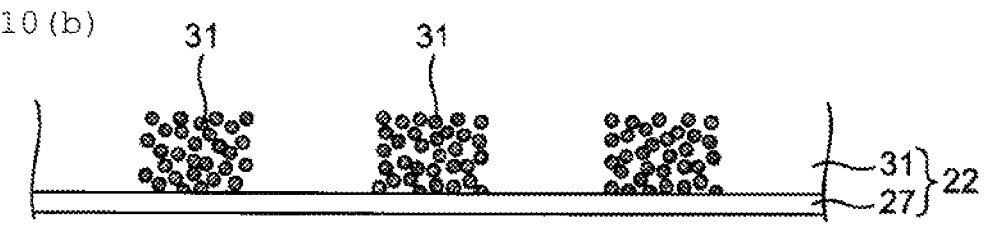

The roughening treatment of the metal support, the placement of the first metal powders on the metal support, and the formation of the low melting-point metal layer on the metal support may be applied to the entire surface of the metal support, or may be applied only to a place where the metal sintered body is to be formed. For example, when the entire upper surface of the metal support is treated to form a metal sintered body on the entire upper surface, there is obtained a conductive base material 22 with high specific surface area in which a metal sintered body 31 is provided over an entire metal support 27 as illustrated in FIG. 10(a). Meanwhile, when only a part of the upper surface of the metal support is treated to form a metal sintered body on the part of the upper surface, there is obtained a conductive base material 22 with high specific surface area in which a metal sintered body 31 is provided on a part of a metal support 27 as illustrated in FIG. 10(b).

In the conductive base material with high specific surface area formed as described above, sintering progresses in the vicinity of the interface between the metal support and the metal sintered body, so that the metal support and the metal sintered body are firmly bonded to each other. Further, the sintering of the metal sintered body other than the vicinity of the interface does not progress relatively, so that the base material is less likely to be warped. In addition, because the metal support is provided, the base material has high strength and is less likely to have troubles such as occurrence of a crack in the dielectric layer.

Figure 11A:
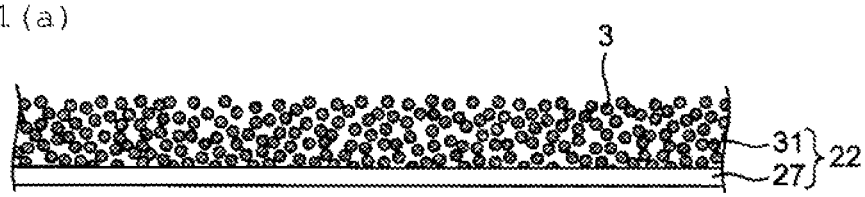
FIGS. 11(a) to 11(c) each are a schematic sectional view for describing a method for manufacturing the capacitor 21 illustrated in FIG. 7.
Figure 11B:
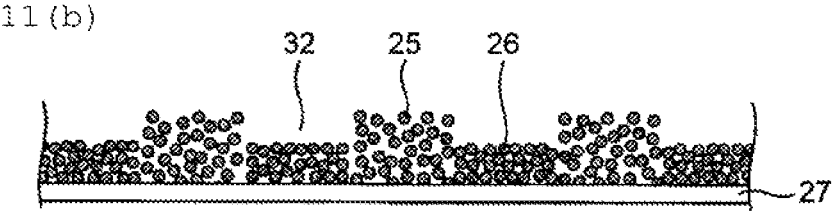

Next, a groove 32 (FIG. 11(b)) is formed in the conductive base material 22 with high specific surface area obtained as described above (FIG. 11(a)). The groove corresponds to a low porosity portion 26, and the other portion corresponds to a high porosity portion 25.

The groove (low porosity portion) can be formed by crushing (or filling) some voids of the conductive base material with high specific surface area obtained as described above.

The low porosity portion 26 is not an indispensable component in the present invention, and may not be provided. For example, a conductive base material with high specific surface area may be obtained by removing the low porosity portion 26 from the conductive base material with high specific surface area illustrated in FIG. 11(b). In addition, a conductive base material with high specific surface area may be one in which the low porosity portion 26 positioned under the groove portion 32 is replaced by a high porosity portion.

In the present embodiment, while the conductive base material 22 with high specific surface area is composed of the high porosity portion 25 and the low porosity portion 26 provided around the high porosity portion 25, the present invention is not limited to this structure. That is, the high porosity portion and the low porosity portion are not particularly limited in existing position, the number of disposition, size, shape, ratio of the both portions, and the like. For example, the conductive base material with high specific surface area may be composed of only a high porosity portion. In addition, electrostatic capacitance of the capacitor can be controlled by adjusting a ratio of the high porosity portion and the low porosity portion.

The method of crushing (filling) voids, the low porosity portion, the porosity and thickness of the low porosity portion, and the like can be similar to those described for the low porosity portion 4 of the capacitor 1 described above.

Figure 11C:
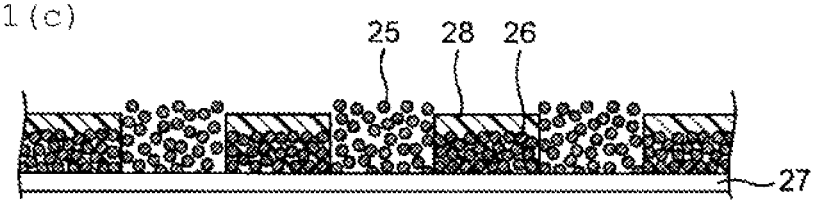

Next, a resin is injected onto the low porosity portion 26 (into the groove) to form an insulating portion 28 (FIG. 11(c)). When the insulating portion 28 is disposed, a short circuit between an upper electrode 24 and the conductive base material 22 with high specific surface area can be prevented.

In the present embodiment, while the insulating portion 28 is provided over the entire of the low porosity portion 26, the insulating portion 28 is not limited to this. The insulating portion 28 may be provided only in a part of the low porosity portion 26, or may be provided to the high porosity portion beyond the low porosity portion.

In addition, the insulating portion 28 is positioned between the low porosity portion 26 and a dielectric layer 23 in the present embodiment, but is not limited to this. The insulating portion 28 may be positioned between the conductive base material 22 with high specific surface area and the upper electrode 24, and may be positioned between the dielectric layer 23 and the upper electrode 24, for example.

While the thickness of the insulating portion 28 is not particularly limited, the thickness is preferably 0.3 μm or more from the viewpoint of more reliably preventing endface discharge, and can be 1 μm or more or 5 μm or more, for example, from the viewpoint of reducing height of the capacitor, the thickness is preferably 100 μm or less, and can be 50 μm or less or 20 μm or less, for example.

The material forming the insulating portion 28 and the method for forming the insulating portion 28 can be similar to those of the insulating portion 9 of the capacitor 1 described above.

The insulating portion 28 is not an indispensable element in the capacitor of the present invention, and may not be provided.

Figure 11D:
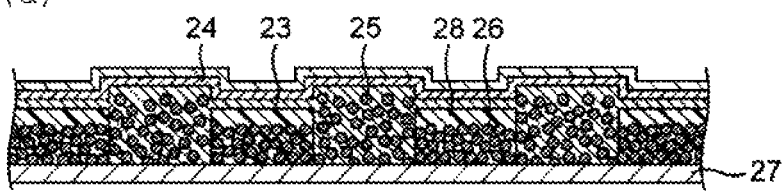
FIGS. 11(d) to 11(f) each are a schematic sectional view for describing the method for manufacturing the capacitor 21 illustrated in FIG. 7.
Figure 11E:
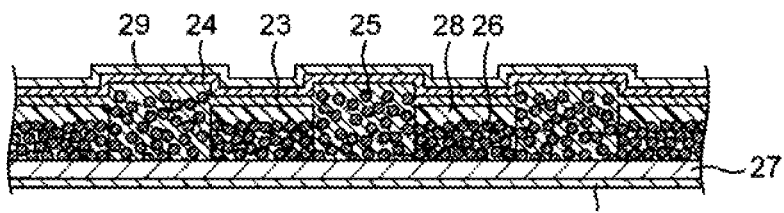

Next, the dielectric layer 23 is formed on the high porosity portion 25 and the insulating portion 28, and then the upper electrode 24 is further formed on the dielectric layer 23 (FIG. 11(d)). In addition, a first, external electrode 29 is formed on the upper electrode 24, and a second external electrode 30 is formed on a metal support 27 (FIG. 11(e)).

The material to be used, the forming method, the thickness, and the like, in the dielectric layer 23, the upper electrode 24, and the first and second external electrodes 29 and 30 can be similar to those in the dielectric layer 6, the upper electrode 7, and the external electrode 8 of the capacitor 1 described above.

Figure 11F:
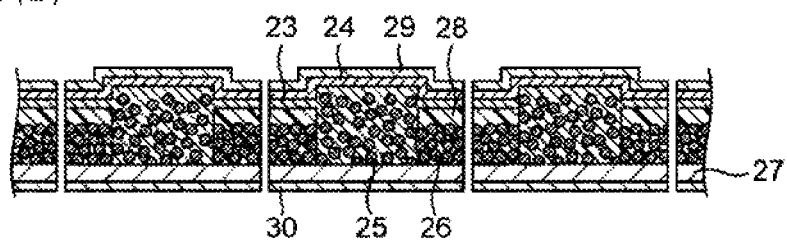

Next, the obtained capacitor collective board is divided into individual parts by fully cutting the central portion of the insulating portion 28 (FIG. 11(f)).

While the capacitor 21 of the present embodiment is described above, various modifications can be made to the capacitor of the present invention.

In the present embodiment, for example, while the capacitor has a substantially rectangular parallelepiped shape, the present invention is not limited to this. The capacitor of the present invention can have any shape, and may have a planar shape of a circle, an ellipse, a rectangle with rounded corners, or the like, for example.

In addition, a layer for increasing adhesion between layers or a buffer layer for preventing diffusion of components between the respective layers may be provided between the respective layers. Further, a protective layer may be provided on a side surface of the capacitor or the like.

In the above embodiment, while the conductive base material 22 with high specific surface area, the insulating portion 28, the dielectric layer 23, and the upper electrode 24 are disposed in this order in the end portion of the capacitor, the present invention is not limited to this. For example, the order of disposition is not particularly limited as long as the insulating portion 28 is positioned between the upper electrode 24 and the conductive base material 22 with high specific surface area. For example, the conductive base material 22 with high specific surface area, the dielectric layer 23, the insulating portion 28, and the upper electrode 24 may be disposed in this order.

In addition, while the capacitor 21 of the above embodiment includes the upper electrode and the outer electrode that are provided up to an edge of the capacitor, the present invention is not limited to this. In an aspect, the upper electrode (preferably the upper electrode and the first external) is disposed away from the edge of the capacitor. This disposition enables end-face discharge to be prevented. That is, the upper electrode does not need to be formed so as to cover the entire of the high porosity portion, and the upper electrode may be formed so as to cover only the high porosity portion.

Further, the capacitor of the above embodiment is provided on only its one principal surface with a metal sintered body, but may be provided on its both principal surfaces with respective metal sintered bodies with a metal support interposed therebetween.

In a preferable aspect, the capacitor of the present invention includes a dielectric layer that is formed by a deposition method (e.g., a gas phase method, preferably an atomic layer deposition method). When the dielectric layer is formed by anodic oxidation, there is a problem that a dielectric film has polarity and dielectric breakdown occurs when a reverse electric field is applied. In addition, there is a defect of hydroxyl groups or the like in an anodic oxide film, so that a capacitor with high breakdown voltage cannot be obtained. The capacitor in the present aspect includes a dielectric film having no defect instead of an anodic oxide film, the dielectric film being formed by a deposition method, so that a capacitor without polarity and with high breakdown voltage can be obtained.

The capacitor of the present invention has high strength because metal powders in the metal sintered body are sufficiently necked, or are firmly bonded to the metal support. An electrolytic capacitor including an anodic oxide film as a dielectric and including a conductive polymer or an electrolyte as an electrode has a self-repairing effect of restoring insulation even when a dielectric layer is broken and shorted; however, a capacitor obtained by a lamination method does not always have a self-repairing effect. Thus, even a slight breakdown starting point may cause insulation breakdown. From the viewpoint of preventing this dielectric breakdown, the capacitor of the present invention having high strength is advantageous.

The capacitor of the present invention has relatively high strength, so that it is suitably mounted on a substrate.

The capacitor of the present invention can be formed directly on a substrate, such as an organic substrate, silicon, ceramics, and a glass substrate, particularly on an organic substrate.

The capacitor of the present invention is fired at relatively low temperature, so that a thermal influence to be applied to a substrate can be reduced. Particularly, when an organic substrate is used, generation of outgas, warpage, and the like can be suppressed.

Thus, the invention also provides a substrate in which the capacitor of the invention is disposed such that the metal support of the conductive base material with high specific surface area of the capacitor is to be bought into close contact with the substrate, particularly an organic substrate.

EXAMPLES

Example 1

Ni powders and Cu powders having an average grain diameter shown in Table 1 were prepared. A metal raw material 1 shown in Table 1 was mixed alone, or mixed with a metal raw material 2 in a predetermined ratio, and was dispersed in ethanol by ball milling with use of zirconia balls each having a diameter of 1 mm. Polyvinyl alcohol was added to this dispersion liquid to prepare metal powder slurries corresponding to sample numbers 1 to 16.

A metal powder layer was formed on a flat alumina substrate by a doctor blade method, using the slurry described above, so as to have a thickness of about 100 µm after being dried. This sample was degreased at 200° C. to 300° C. in a firing furnace, and then was heat treated at 300° C. to 650° C. for 5 minutes in an $N_2$ atmosphere to obtain a metal sintered body. The metal sintered body did not stick to the alumina substrate and could be separated from the alumina substrate as a metal sintered body.

This metal sintered body was used as a conductive base material with high specific surface area. The metal sintered body had a plate shape of about 50 mm on each side and was processed as a collective substrate. Subsequently, grooves were formed on the collective substrate by using a fiber laser device or a nanosecond laser device. Each of the grooves corresponds to a low porosity portion.

Subsequently, a polyimide resin was filled in the groove so as to sufficiently permeate into pores of the groove using an air type dispenser device.

Subsequently, an SiOx film with a thickness of 25 nm was formed on the metal sintered body by the ALD method to form a dielectric layer, and then a TiN film was formed on the dielectric layer by the ALD method, to form an upper electrode.

Subsequently, a pattern was formed on upper and lower surfaces of the collective substrate by vapor deposition, and then a Cu layer as an external electrode was formed by electroless plating.

The central portion of the insulator filled in the groove was fully cut so as to be divided into individual parts, thereby obtaining capacitors (sample numbers 1 to 16) each having a size of 1.0 mm×0.5 mm. The sample numbers 1, 2, 3, 7 and 13 each are a comparative example.

Evaluation

The electrostatic capacitance of the capacitor prepared as described above was measured at 1 MHz and 1 mV using an impedance analyzer. In addition, a sample having an edge resistance of 1 kΩ or less when a DC electric field of 5V was applied was determined as a short circuit sample to calculate a short circuit ratio. Table 1 shows each result.

The porosity of the metal sintered body was obtained in the following manner. First, the substantially central portion of the capacitor sample was sliced by a micro sampling method using FIB to prepare an analytical sample. A damage layer formed on a surface of the sample during the FIB processing was removed by Ar ion milling. SMI 3050 SE (manufactured by Seiko Instruments Inc.) was used for the FIB processing, and PIPS Model 691 (manufactured by Gatan) was used for the Ar ion milling in processing the analysis sample. Next, the range of 3 µm×3 µm of the analytical sample was observed with a scanning transmission electron microscope (STEM). For the STEM, JEM-2200FS (manufactured by JEOL Ltd.) was used (acceleration voltage=200 kV). Image analysis of the observation region was performed, and the porosity was obtained from an area where metal of the metal sintered body exists. The porosity of each of any three places was obtained, and Table 1 shows each of average values of the three places.

TABLE 1

| Sample number | Metal raw material 1 | | | Metal raw material 2 | | | Sintering temperature °C. | Porosity of metal with high specific surface area % | Electrostatic capacitance μF | Short circuit ratio % |
|---|---|---|---|---|---|---|---|---|---|---|
| | Metal species — | Average grain diameter nm | Compounding ratio wt % | Metal species — | Average grain diameter nm | Compounding ratio wt % | | | | |
| 1* | Ni | 590 | 100 | — | — | — | 650 | 23 | 0.02 | 0 |
| 2* | Ni | 480 | 100 | — | — | — | 500 | 26 | 0.02 | 0 |
| 3* | Ni | 480 | 100 | — | — | — | 450 | 48 | — | 100 |
| 4 | Ni | 480 | 80 | Ni | 51 | 20 | 450 | 45 | 0.11 | 0 |
| 5 | Ni | 480 | 70 | Ni | 88 | 30 | 450 | 47 | 0.10 | 0 |
| 6 | Ni | 480 | 60 | Ni | 210 | 40 | 450 | 50 | 0.07 | 67 |
| 7* | Ni | 210 | 100 | — | — | — | 400 | 21 | 0.04 | 0 |
| 8 | Ni | 210 | 70 | Ni | 51 | 30 | 350 | 51 | 0.21 | 0 |
| 9 | Ni | 210 | 80 | Ni | 11 | 20 | 350 | 48 | 0.32 | 0 |
| 10 | Ni | 120 | 90 | Ni | 11 | 10 | 325 | 42 | 0.29 | 0 |
| 11 | Cu | 250 | 80 | Cu | 13 | 20 | 300 | 47 | 0.35 | 0 |
| 12 | Cu | 250 | 55 | Cu | 62 | 45 | 300 | 38 | 0.15 | 6 |
| 13* | Cu | 250 | 100 | — | — | — | 350 | 16 | 0.03 | 0 |
| 14 | Ni | 210 | 60 | Cu | 250 | 40 | 350 | 42 | 0.09 | 0 |
| 15 | Ni | 210 | 70 | Cu | 62 | 30 | 300 | 48 | 0.16 | 0 |
| 16 | Ni | 590 | 80 | Cu | 62 | 20 | 400 | 43 | 0.09 | 0 |

As shown in Table 1, it was found that the capacitor of the present invention obtained by mixing and firing two kinds of metal powders achieves high electrostatic capacitance and a low short circuit ratio.

Example 2

Ni powders and Cu powders having an average grain diameter shown in Table 2 were prepared. A metal raw material 1 shown in Table 2 alone or mixed with a metal raw material 2 in a predetermined ratio was dispersed in ethanol by ball milling with use of zirconia balls each having a diameter of 1 mm. Polyvinyl alcohol was added to this dispersion liquid to prepare metal powder slurries corresponding to sample numbers 21 to 35.

Meanwhile, a Ni foil and a Cu foil were prepared as a metal support, and were dipped in an alkaline solution so that surface treatment was applied to each metal foil. Then, a surface of each metal foil was roughened with a sulfuric acid-hydrogen peroxide type etching agent while treatment time was changed.

The slurry described above was applied to the Ni foil and the Cu foil by a doctor blade method to form a metal powder layer such that the metal powder layer after drying had a thickness of about 50 μm. This sample was degreased at 200° C. to 300° C. in a firing furnace, and then was heat treated at 300° C. to 600° C. for 5 minutes in an atmosphere to obtain a metal sintered body.

A base material provided only on its one surface with the metal sintered body obtained as described above was used as a conductive base material with high specific surface area. The metal sintered body had a plate shape of about 50 mm on each side and was processed as a collective substrate.

First, grooves were formed on the collective substrate by using a fiber laser device or a nanosecond laser device. Each of the grooves corresponds to a low porosity portion.

Next, an SiON film with a thickness of 15 nm was formed on the metal sintered body by the ALD method to form a dielectric layer. Subsequently, the groove was filled with a polyimide resin using an air type dispenser device to form an insulating portion. Subsequently, a TIN film was formed on the dielectric layer and the insulating portion by the ALD method to form an upper electrode, and a Ti film and a Cu film were formed on upper and lower surfaces of the base material by sputtering. Then, an external electrode of Cu was formed by electroless plating.

The central portion of the insulating portion filled in the groove was fully cut to be divided into individual parts using a fiber laser device or a nanosecond laser device, thereby obtaining capacitors (sample numbers 21 to 35) each having a size of 1.5 mm×1.5 mm. The sample numbers 21, 27, 32 and 34 each are a comparative example.

Evaluation

As with Example 1, electrostatic capacitance, short circuit ratio, and porosity were measured. Table 2 shows each result.

TABLE 2

| Sample number | Metal support | | | Metal raw material 1 | | | Metal raw material 2 | | | Sintering temperature °C. | Porosity of metal with high specific surface area % | Electrostatic capacitance μF | Short circuit ratio % |
|---|---|---|---|---|---|---|---|---|---|---|---|---|---|
| | Metal species — | Thickness μm | Distance between recesses nm | Metal species — | Average grain diameter nm | Compounding ratio wt % | Metal species — | Average grain diameter nm | Compounding ratio wt % | | | | |
| 21* | Ni | 30 | >2000 | Ni | 590 | 100 | — | — | — | 600 | 35 | — | 100 |
| 22 | Ni | 30 | 190 | Ni | 590 | 100 | — | — | — | 600 | 33 | 0.27 | 0 |

TABLE 2-continued

| | Metal support | | | Metal raw material 1 | | | Metal raw material 2 | | | Sintering temperature °C. | Porosity of metal with high specific surface area % | Electrostatic capacitance µF | Short circuit ratio % |
|---|---|---|---|---|---|---|---|---|---|---|---|---|---|
| Sample number | Metal species — | Thickness µm | Distance between recesses nm | Metal species — | Average grain diameter nm | Compounding ratio wt % | Metal species — | Average grain diameter nm | Compounding ratio wt % | | | | |
| 23 | Ni | 30 | 73 | Ni | 590 | 100 | — | — | — | 600 | 35 | 0.29 | 0 |
| 24 | Ni | 30 | 190 | Ni | 480 | 100 | — | — | — | 450 | 45 | 0.45 | 11 |
| 25 | Ni | 10 | 150 | Ni | 480 | 100 | — | — | — | 450 | 46 | 0.46 | 0 |
| 26 | Ni | 30 | 73 | Ni | 480 | 70 | Ni | 88 | 30 | 400 | 49 | 0.89 | 0 |
| 27* | Ni | 30 | >2000 | Ni | 480 | 70 | Ni | 88 | 30 | 400 | 47 | 0.82 | 83 |
| 28 | Ni | 3 | 34 | Ni | 88 | 100 | — | — | — | 325 | 42 | 1.7 | 17 |
| 29 | Ni | 3 | 34 | Ni | 120 | 100 | — | — | — | 350 | 46 | 1.6 | 0 |
| 30 | Cu | 6 | 58 | Cu | 250 | 100 | — | — | — | 325 | 38 | 0.72 | 0 |
| 31 | Cu | 20 | 108 | Cu | 250 | 100 | — | — | — | 325 | 38 | 0.68 | 11 |
| 32* | Cu | 20 | >2000 | Cu | 250 | 100 | — | — | — | 325 | 39 | — | 100 |
| 33 | Cu | 20 | 108 | Ni | 120 | 100 | — | — | — | 350 | 47 | 1.8 | 17 |
| 34* | Ni | 6 | >2000 | Ni | 120 | 100 | — | — | — | 350 | 46 | — | 100 |
| 35 | Cu | 6 | 58 | Ni | 210 | 80 | Cu | 62 | 20 | 300 | 45 | 1.4 | 0 |

In addition, an average diameter of necking was measured for each of the sample numbers 21 and 23 as follows. As with the measurement of the porosity, a thin sample of a capacitor sample was prepared and image analysis was performed. Fifty pieces of each of necking between the metal powders and the metal support and necking for connecting the metal powders were randomly selected, and the minimum width of each of necked portions was measured to obtain an average value of 20 large values. Results are shown in Table 3 below.

TABLE 3

| | Average diameter of necking (nm) | |
|---|---|---|
| Sample number | Between metal powders | Between metal sintered body and metal support |
| 21* | 130 | 52 |
| 23 | 150 | 210 |

As shown in Table 2, it was found that the capacitor of the present invention provided with a surface sufficiently roughened has a low short circuit ratio. This is probably because necking between the metal sintered body and the metal support had sufficiently progressed by roughening the surface of the metal support. As shown in Table 3, it was found that the capacitor of the present invention provided with a surface sufficiently roughened has an average diameter of necking between the metal sintered body and the metal support larger than an average diameter of necking between the metal powders.

Example 3

Ni powders and Cu powders having an average grain diameter shown in Table 3 were prepared. A metal raw material 1 shown in Table 3 alone or mixed with a metal raw material 2 in a predetermined ratio was dispersed in ethanol by ball milling with use of zirconia balls each having a diameter of 1 mm. Polyvinyl alcohol was added to this dispersion liquid to prepare metal powder slurries corresponding to sample numbers 41 to 56.

Meanwhile, a Ni foil with a thickness of 10 µm (sample numbers 41 to 53) provided with a non-roughened surface and a Ni foil with a thickness of 10 µm (sample number 54) provided with a surface that is roughened so as to have a distance between recesses of 0.15 µm were prepared as a support. In addition, an epoxy resin was applied to a flat glass plate by spin coating, and a Ni metal layer with a thickness of 0.5 µm was formed by sputtering to prepare a support (the sample number 55). Further, an epoxy resin was applied to a flat glass plate by spin coating, and a Cu layer with a thickness of 1 µm was formed by electroless plating to prepare a support (the sample number 56).

A slurry of metal powders shown in a metal grain layer 1 of Table 3 was applied to each of the supports above with a pattern using an ink-jet, and was dried. After that, a slurry of metal powders shown in a metal grain layer 2 of Table 3, the metal powders having a relatively large average grain diameter, was applied using an ink-jet with a large nozzle diameter. Then, a layer with a thickness of several µm was formed almost on the metal grain layer 1, and drying and application were repeated to form, a metal powder layer with a total thickness of about 100 µm after drying. This sample was degreased at 200° C. to 300° C. in a firing furnace, and then was heat treated at 300° C. to 600° C. for 5 minutes in an $N_2$ atmosphere to obtain a metal sintered body.

A base material provided only on its one surface with the metal sintered body obtained as described above was used as a conductive base material with high specific surface area. The metal sintered body had a plate shape of about 50 mm on each side and was processed as a collective substrate.

Subsequently, capacitors (sample numbers 41 to 56) were obtained in the same manner as in Example 2, except that an AlOx film with a thickness of 20 nm was formed by the ALD method as a dielectric layer, and that the sample numbers 41 to 54 were formed by being divided into individual capacitors each with a size of 0.4 mm×0.4 mm, and the sample numbers 55 and 56 were formed by being divided into individual capacitors each with a size of 0.3 mm×0.3 mm. The sample numbers 41, 48, and 49 each are a comparative example.

Evaluation

As with Example 1, electrostatic capacitance, short circuit ratio, and porosity were measured. Table 4 shows each result.

TABLE 4

| Sample number | Metal grain layer 1 | | | Metal raw material 1 of metal grain layer 2 | | | Metal raw material 2 of metal grain layer 2 | | | Sintering temperature ° C. | Porosity of metal with high specific surface area % | Electrostatic capacitance μF | Short circuit ratio % |
|---|---|---|---|---|---|---|---|---|---|---|---|---|---|
| | Metal species — | Average grain diameter nm | Thickness μm | Metal species — | Average grain diameter nm | Compounding ratio wt % | Metal species — | Average grain diameter nm | Compounding ratio wt % | | | | |
| 41* | — | — | — | Ni | 210 | 100 | — | — | — | 375 | 39 | — | 100 |
| 42 | Ni | 11 | 4 | Ni | 210 | 100 | — | — | — | 375 | 38 | 0.11 | 0 |
| 43 | Ni | 51 | 4 | Ni | 210 | 100 | — | — | — | 375 | 38 | 0.12 | 0 |
| 44 | Ni | 96 | 4 | Ni | 210 | 100 | — | — | — | 375 | 39 | 0.12 | 0 |
| 45 | Cu | 13 | 8 | Ni | 210 | 100 | — | — | — | 375 | 37 | 0.10 | 0 |
| 46 | Cu | 250 | 8 | Ni | 210 | 100 | — | — | — | 375 | 38 | 0.11 | 0 |
| 47 | Ni | 51 | 10 | Ni | 210 | 70 | Ni | 51 | 30 | 350 | 49 | 0.19 | 0 |
| 48* | — | — | — | Ni | 210 | 70 | Ni | 51 | 30 | 350 | 47 | 0.18 | 72 |
| 49* | Ni | 11 | 3 | Ni | 480 | 70 | — | — | — | 425 | 39 | 0.03 | 78 |
| 50 | Ni | 25 | 10 | Ni | 480 | 70 | — | — | — | 425 | 40 | 0.05 | 0 |
| 51 | Ni | 25 | 30 | Ni | 120 | 90 | Ni | 11 | 10 | 325 | 46 | 0.28 | 0 |
| 52 | Ni | 25 | 0.4 | Ni | 120 | 100 | — | — | — | 325 | 46 | 0.23 | 0 |
| 53 | Cu | 13 | 0.5 | Ni | 120 | 100 | — | — | — | 325 | 44 | 0.22 | 0 |
| 54 | Ni | 51 | 4 | Ni | 210 | 100 | — | — | — | 375 | 42 | 0.13 | 0 |
| 55 | Ni | 25 | 1 | Ni | 77 | 10 | — | — | — | 315 | 45 | 0.11 | 8 |
| 56 | Ni | 25 | 4 | Ni | 77 | 6 | — | — | — | 315 | 45 | 0.13 | 14 |

In addition, an average diameter of necking was measured for each of the sample numbers 21 and 23 in the same manner as in Example 2. Results are shown in Table 5 below.

TABLE 5

| Sample number | Average diameter of necking (nm) | |
|---|---|---|
| | Between metal powders | Between metal sintered body and metal support |
| 41* | 68 | 47 |
| 43 | 72 | 110 |
| 45 | 81 | 130 |

As shown in Table 4, it was found that the capacitor of the present invention prepared by disposing the metal powders having a predetermined grain size on a surface of the metal support has a low short circuit ratio. This is probably because necking in the interface between the metal support and the metal sintered body had sufficiently progressed due to the metal powders in the surface of the metal support. As shown in Table 5, it was found that the capacitor of the present invention prepared by disposing the metal powders having a predetermined grain diameter on the surface of the metal support has an average diameter of necking between the metal sintered body and the metal support larger than an average diameter of necking between the metal powders.

Example 4

Prepared was an epoxy resin substrate that had a size of about 100 mm on each side and that was provided on its front and back surfaces with a Cu foil or Ni foil with a thickness of 10 μm. The metal foil on the resin substrate was patterned beforehand for forming an electronic circuit.

Meanwhile, Ni powders and Cu powders having an average grain diameter shown in Table 4 were prepared. A metal raw material 1 shown in Table 4 alone or mixed with a metal raw material 2 in a predetermined ratio was dispersed in ethanol by ball milling with use of zirconia balls each having a diameter of 1 mm. Polyvinyl alcohol was added to this dispersion liquid to prepare metal powder slurries corresponding to sample numbers 61 to 71.

A slurry of metal powders shown in a metal grain layer 1 of Table 4 was applied a plurality of times to places within a range of 1 mm at an interval of 1.5 mm per capacitor on the metal foil (metal species on an organic substrate in Table 4) on the resin substrate by using an Inkjet method, and then was dried. After that, a slurry of metal powders shown in a metal grain layer 2 of Table 4, the metal powders having a relatively large average grain diameter, was applied using an ink-jet with a large nozzle diameter. Then, a layer with a thickness of several μm was formed, and drying and application were repeated to form a metal powder layer with a total thickness of about 20 μm after drying. This sample was degreased at 200° C. to 300° C. in a firing furnace, and then was heat treated at 290° C. to 450° C. for 5 minutes in an N2 atmosphere to obtain a metal sintered body.

A base material provided only on its one surface with the metal sintered body obtained as described above was used as a conductive base material with high specific surface area.

Subsequently, an AlOx film with a thickness of 15 nm was formed at 300° C. by the ALD method to form a dielectric layer. Subsequently, a poly inside resin was applied to a portion between the metal sintered bodies using an air type dispenser device to form an insulating portion. Then, a TiN film was formed at 350° C. by the ALD method as an upper electrode. Subsequently, Cu was formed with a pattern on only an upper surface of the metal sintered body of the substrate by vapor deposition, and external electrode was formed by plating to obtain each of capacitors (the sample numbers 61 to 71). The sample numbers 61, 63, 69 and 70 each are a comparative example.

Evaluation

As with Example 1, electrostatic capacitance, short circuit ratio, and porosity were measured. Table 6 shows each result. The substrate was placed on a flat surface plate while a recess of the substrate faces downward, and the amount of warp was measured with a flat gauge. A value obtained by subtracting an average foil thickness from a value of the gauge was taken as the amount of warp.

TABLE 6

| Sample number | Metal species on organic substrate | Metal grain layer 1 | | | Metal raw material 1 of metal grain layer 2 | | | Metal raw material 2 of metal grain layer 2 |
|---|---|---|---|---|---|---|---|---|
| | | Metal species | Average grain diameter nm | Thickness μm | Metal species | Average grain diameter nm | Compounding ratio wt % | Metal species |
| 61* | Ni | — | — | — | Ni | 480 | 100 | — |
| 62 | Ni | Ni | 88 | 3 | Ni | 480 | 70 | Ni |
| 63* | Ni | — | — | — | Ni | 88 | 100 | — |
| 64 | Ni | Ni | 25 | 1 | Ni | 88 | 100 | — |
| 65 | Ni | Ni | 25 | 1 | Ni | 88 | 90 | Ni |
| 66 | Ni | Ni | 25 | 1 | Ni | 88 | 80 | Cu |
| 67 | Ni | Cu | 13 | 1 | Ni | 88 | 100 | — |
| 68 | Cu | Ni | 25 | 0.5 | Ni | 88 | 90 | Ni |
| 69* | Cu | — | — | — | Cu | 250 | 100 | — |
| 70* | Cu | — | — | — | Cu | 250 | 100 | — |
| 71 | Cu | Cu | 62 | 2 | Cu | 250 | 100 | — |

| Sample number | Metal raw material 2 of metal grain layer 2 | | Sintering temperature °C. | Warp nm | Porosity of metal with high specific surface area % | Electrostatic capacitance μF | Short circuit ratio % |
|---|---|---|---|---|---|---|---|
| | Average grain diameter nm | Compounding ratio wt % | | | | | |
| 61* | — | — | 450 | 2.8 | 39 | — | 100 |
| 62 | 51 | 30 | 350 | 0.8 | 43 | 0.40 | 22 |
| 63* | — | — | 350 | 1.6 | 19 | 0.24 | 67 |
| 64 | — | — | 300 | 0.6 | 46 | 0.69 | 14 |
| 65 | 25 | 10 | 300 | 0.5 | 44 | 0.71 | 12 |
| 66 | 62 | 20 | 300 | 0.5 | 40 | 0.62 | 14 |
| 67 | — | — | 300 | 0.4 | 47 | 0.68 | 16 |
| 68 | 25 | 10 | 290 | 0.3 | 46 | 0.79 | 9 |
| 69* | — | — | 350 | 3.7 | 14 | 0.06 | 50 |
| 70* | — | — | 300 | 0.5 | 47 | — | 100 |
| 71 | — | — | 300 | 0.8 | 45 | 0.25 | 22 |

As shown in Table 6, it was found that the capacitor of the present invention fired using a plurality of kinds of metal powders has a low short circuit ratio and a small warp of a substrate even when baked on the substrate. This is probably because a metal sintered body having sufficient strength can be obtained without excessive progress of firing. In addition, it is thought that a reason why the overall short circuit ratio is higher than that of Example 1 is variation in film thickness and film quality caused by a local CVD reaction occurring due to outgas generated from the resin substrate during the ALD.

The capacitor of the present invention has high electrostatic capacitance, and thus is suitably used for various electronic devices. The capacitor of the present invention is mounted on a substrate to be used as an electronic component. Alternatively, the capacitor of the present invention is embedded in a substrate or an interposer to be used as an electronic component.

DESCRIPTION OF REFERENCE SYMBOLS

1: capacitor
2a, 2a1, 2b, 2b': electrostatic capacitance forming part
3: conductive base material with high specific surface area
4: low porosity portion
5, 5a, 5b: high porosity portion
6, 6a, 6a', 6b, 6b': dielectric layer
7, 7a, 7a', 7b, 7b': upper electrode
8, 8a, 8a 8b, 8b': external electrode
9: insulating portion
11: groove
12: capacitor collective board
21: capacitor
22: conductive base material with high specific surface area
23: dielectric layer
24: upper electrode
25: high porosity portion
26: low porosity portion
27: metal support
28: insulating portion
29: first external electrode
30: second external electrode
31: metal sintered body
32: groove
33: necking portion
34: necking portion

The invention claimed is:

1. A capacitor comprising:
a conductive base material formed of a metal sintered body and having a porous portion with a porosity of 30% or more;
a dielectric layer covering at least the porous portion of the conductive base material; and
an electrode covering the dielectric layer, wherein
the metal sintered body is a sintered body formed from at least two kinds of metal powders each of which having a different average grain diameter, and,
of the at least two kinds of metal powders, a ratio of a first average grain diameter of a first metal powder having a smallest average grain diameter to a second average grain diameter of a second metal powder, which is a main component of the metal sintered body, is ⅓ or less.

2. The capacitor according to claim 1, wherein each of the at least two kinds of metal powders has a different melting point.

3. The capacitor according to claim 2, wherein a first melting point of the first metal is 100° C. or more lower than a second melting point of the second metal.

4. The capacitor according to claim 1, wherein a metal constituting the metal sintered body is one or more kinds of metals selected from Ni, Cu, W, Mo, Au, Ir, Ag, Rh, Ru, Co and Fe.

5. The capacitor according to claim 1, wherein the dielectric layer is an atomic layer deposited dielectric layer.

6. The capacitor according to claim 1, wherein the electrode is an atomic layer deposited electrode.

7. A capacitor comprising:
a conductive base material formed of a metal sintered body and having a porous portion with a porosity of 30% or more;
a dielectric layer covering at least the porous portion of the conductive base material; and
an electrode covering the dielectric layer, wherein
the porous portion is a first porous portion, and the conductive base material includes a second porous portion with a porosity of 30% or more,
the dielectric layer is a first dielectric layer which covers a first principal surface of the first porous portion, and
the electrode is a first electrode which covers the first dielectric layer,
the capacitor further comprising:
a second dielectric layer which covers a second principal surface of the first porous portion opposite the first principal surface;
a third dielectric layer which covers a third principal surface of the second porous portion;
a fourth dielectric layer which covers a fourth principal surface of the second porous portion opposite the third principal surface;
a second electrode which covers the second dielectric layer;
a third electrode which covers the third dielectric layer; and
a fourth electrode which covers the fourth dielectric layer,
wherein the first porous portion, the first dielectric layer and the first electrode form a first electrostatic capacitance forming portion,
the first porous portion, the second dielectric layer and the second electrode form a second electrostatic capacitance forming portion,
the second porous portion, the third dielectric layer and the third electrode form a third electrostatic capacitance forming portion,
the second porous portion, the fourth dielectric layer and the fourth electrode form a fourth electrostatic capacitance forming portion,
the first electrostatic capacitance forming portion and the third electrostatic capacitance forming portion are disposed along a first principal surface of the conductive base material,
the second electrostatic capacitance forming portion and the fourth electrostatic capacitance forming portion are disposed along a second principal surface of the conductive base material,
the first electrostatic capacitance forming portion and the second electrostatic capacitance forming portion face each other with the first porous portion interposed therebetween, and
the third electrostatic capacitance forming portion and the fourth electrostatic capacitance forming portion face each other with the second porous portion interposed therebetween.

8. A capacitor comprising:
a conductive base material including a metal sintered body formed from a metal powder, and a metal support on which the metal sintered body is supported by necking, the conductive base material having a porous portion with a porosity of 30% or more;
a dielectric layer covering at least the porous portion of the conductive base material, the dielectric layer being formed from atoms each having an origin different from an origin of the conductive base material; and
an electrode covering the dielectric layer,
wherein
a first average diameter of necking connecting the metal sintered body and the metal support to each other is larger than a second average diameter of necking between the metal powders in the metal sintered body.

9. The capacitor according to claim 8, wherein a first melting point of a first metal at an interface between the metal sintered body and the metal support is 100° C. or more lower than a second melting point of a second metal at a central portion of the metal sintered body.

10. The capacitor according to claim 8, wherein a first melting point of a first metal at an interface between the metal sintered body and the metal support is 100° C. or more lower than a second melting point of a second metal of the metal support.

11. The capacitor according to claim 8, wherein the metal powder of the metal sintered body is at least two kinds of metal powders each of which has a different average grain diameter.

12. The capacitor according to claim 11, wherein, of the at least two kinds of metal powders, a ratio of a first average grain diameter of a first metal powder having a smallest average grain diameter to a second average grain diameter of a second metal powder, which is a main component of the metal sintered body, is ⅓ or less.

13. The capacitor according to claim 8, wherein the metal powder of the metal sintered body is at least two kinds of metal powders each of which has a different melting point.

14. The capacitor according to claim 13, wherein, of the at least two kinds of metal powders, a first melting point of a first metal powder is 100° C. or more lower than a second melting point of a second metal, which is a main component of the metal sintered body.

15. The capacitor according to claim 8, wherein a metal of the metal powder is one or more kinds of metals selected from Ni, Cu, W, Mo, Au, Ir, Ag, Rh, Ru, Co and Fe.

16. The capacitor according to claim 8, wherein the dielectric layer is an atomic layer deposited dielectric layer.

17. The capacitor according to claim 8, wherein the electrode is an atomic layer deposited electrode.

18. The capacitor according to claim 8, wherein
the porous portion is a first porous portion, and the conductive base material includes a second porous portion with a porosity of 30% or more,
the dielectric layer covers the first and second porous portions of the conductive base material, the first porous portion, the dielectric layer and the electrode form a first electrostatic capacitance forming portion, the second porous portion, the dielectric layer and the electrode form a second electrostatic capacitance forming portion, the first and second electrostatic capacitance forming portions are adjacent to each other, and the capacitor further comprises an insulating portion between the electrode and the conductive base material.

* * * * *